(12) United States Patent
Wan et al.

(10) Patent No.: US 11,189,003 B2
(45) Date of Patent: Nov. 30, 2021

(54) GRAPHICS PROCESSING METHOD AND RELATED APPARATUS, AND DEVICE FOR UNIDIRECTIONALLY TRANSMITTING CALLING INFORMATION OF A GRAPHICS API TO A CLIENT

(71) Applicant: HUAWEI TECHNOLOGIES CO., LTD., Shenzhen (CN)

(72) Inventors: Shuang Wan, Shenzhen (CN); Wei Huang, Shenzhen (CN); Fuwen Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/854,929

(22) Filed: Apr. 22, 2020

(65) Prior Publication Data

US 2020/0250790 A1 Aug. 6, 2020

Related U.S. Application Data

(63) Continuation of application No. PCT/CN2017/107341, filed on Oct. 23, 2017.

(51) Int. Cl.
*G06T 1/20* (2006.01)
*G09G 5/36* (2006.01)
(Continued)

(52) U.S. Cl.
CPC ............... *G06T 1/20* (2013.01); *G06F 9/547* (2013.01); *G09G 5/363* (2013.01); *G06T 2200/16* (2013.01)

(58) Field of Classification Search
None
See application file for complete search history.

(56) References Cited

U.S. PATENT DOCUMENTS 5,903,278 A * 5/1999 Mitchell ................. G06T 15/00
345/589
8,035,636 B1 * 10/2011 Yang ....................... G06T 15/00
345/419

(Continued)

FOREIGN PATENT DOCUMENTS

CN 102246154 A 11/2011
CN 102349063 A 2/2012
(Continued)

*Primary Examiner* — Joni Hsu
(74) *Attorney, Agent, or Firm* — Rimon PC

(57) ABSTRACT

This application discloses a graphics processing method and related apparatus, and a device. The method includes: obtaining a first drawing instruction that is initiated by an application program and that corresponds to a first graphics API; calling a first graphics API in a first graphics library according to the first drawing instruction to execute the first drawing instruction, and sending a first processing notification to the application program; generating calling information of the first graphics API; and sending the calling information of the first graphics API to the client. According to the foregoing solutions, the server unidirectionally transmits calling information of a graphics API to the client, so that a requirement for a network latency can be reduced, and proper running of the application program on the server can be ensured in a disconnected network, thereby improving user experience.

18 Claims, 14 Drawing Sheets

(51) Int. Cl.
*G06T 1/60* (2006.01)
*G06F 9/54* (2006.01)

(56) References Cited

U.S. PATENT DOCUMENTS

| | | | |
|---|---|---|---|
| 9,064,292 B1 * | 6/2015 | Tidd | G06T 1/00 |
| 2006/0080406 A1 | 4/2006 | Sacks | |
| 2008/0271048 A1 | 10/2008 | Fradkov et al. | |
| 2008/0303846 A1 * | 12/2008 | Brichter | G06F 3/14 |
| | | | 345/661 |
| 2009/0248475 A1 * | 10/2009 | Choi | G06Q 10/107 |
| | | | 709/219 |
| 2010/0146127 A1 | 6/2010 | Schmieder et al. | |
| 2010/0228871 A1 | 9/2010 | Abdo et al. | |
| 2012/0084456 A1 | 4/2012 | Vonog et al. | |
| 2012/0117145 A1 | 5/2012 | Clift et al. | |
| 2014/0059114 A1 * | 2/2014 | Kim | H04L 67/42 |
| | | | 709/203 |
| 2014/0115644 A1 | 4/2014 | Kim et al. | |
| 2016/0165010 A1 * | 6/2016 | Bacovsky | G06F 8/30 |
| | | | 709/203 |
| 2016/0239938 A1 | 8/2016 | Keslin | |
| 2017/0142432 A1 | 5/2017 | Wei et al. | |

FOREIGN PATENT DOCUMENTS

| | | |
|---|---|---|
| CN | 102668495 A | 9/2012 |
| CN | 103164838 A | 6/2013 |
| CN | 103457965 A | 12/2013 |
| CN | 103593184 A | 2/2014 |
| CN | 104065679 A | 9/2014 |
| CN | 104536758 A | 4/2015 |
| CN | 104737549 A | 6/2015 |
| CN | 106161630 A | 11/2016 |

* cited by examiner

GRAPHICS PROCESSING METHOD AND RELATED APPARATUS, AND DEVICE FOR UNIDIRECTIONALLY TRANSMITTING CALLING INFORMATION OF A GRAPHICS API TO A CLIENT

CROSS-REFERENCE TO RELATED APPLICATIONS

This application is a continuation of International Application No. PCT/CN2017/107341, filed on Oct. 23, 2017, the disclosure of which is hereby incorporated by reference in its entirety.

TECHNICAL FIELD

This application relates to the field of information technologies, to implement remote interface drawing through unidirectional data transmission from a server to a client.

BACKGROUND

With development of mobile internet and cloud computing, as the cloud computing features convenient management, a large storage capacity, and high stability, migrating an application program from a client to a server becomes a future development trend. After the application program on the client is migrated to the server, a user interface (UI) of the application program running on the server needs to be displayed to a terminal by using a wide area network, so that data exchange between the client and the server becomes more frequent.

In the prior art, an open graphics library (Opengl) based on a client-server (C-S) mode can be used to implement drawing on a remote display screen of an application program. In a client-server architecture, a client is provided with a graphics processing unit (GPU), and also provided with an Opengl graphics library. The Opengl graphics library is provided with a graphics application programming interface (API). The server is provided with no GPU,and provided with no Opengl graphic library, either. However, an application program is run on the server, and the application program needs to call a graphics API from the Opengl graphics library on the client. When the application program needs to call a graphics API, the server sends the to-be-called graphics API to the client, and the client calls the graphics API in the local Opengl graphics library. In a process of calling the graphics API, the client runs drawing code of the graphics API, where the drawing code is used to control the local GPU on the client to perform graphics drawing.

In the prior art, generation of each frame of image requires a plurality of callings of graphics APIs, and the graphics APIs are mostly serially called. For example, the application program on the server needs to sequentially call two graphics APIs. Instead of locally calling the two graphics APIs from the server, the application program separately sends the two graphics APIs to the client, so that the graphics APIs are called by the client.

In the prior art, the application program on the server sends a first graphics API and an input parameter of the first graphics API to the client, and waits after sending the foregoing data to the client. During waiting of the application program, the client locally calls the first graphics API from the Opengl graphics library on the client based on the input parameter of the first graphics API. After the first graphics API has been called, the client sends a processing notification to the application program on the server, where the processing notification is used to notify the application program that the first graphics API has been called. The application program on the server can end waiting only after receiving the processing notification sent by the client, and sends an input parameter of a second graphics API and the second graphics API to the client.

Consequently, in the prior art, each time a graphics API is called, bidirectional data transmission between the server and the client needs to be performed, and the server needs to wait for a processing notification returned by the client.

In a low-latency network, for example, in a local area network, a network latency for the foregoing remote graphics API calling is within 1 millisecond, and more than 1000 callings can be completed within 1 second. Therefore, comparatively good experience can be provided when a to-be-drawn graphics interface is simple.

However, in a wide area network, especially in a wireless wide area network environment, such as in a 3G or 4G network, if a network latency for the foregoing remote graphics API calling is between 100 milliseconds and 300 milliseconds, a maximum of 10 callings, that is, only 1% of the quantity of 1000 graphics API callings can be completed within 1 second. Therefore, in the prior art, a requirement for a network latency is comparatively high, and good user experience cannot be provided in a high-latency network.

SUMMARY

This application discloses a graphics processing method and related apparatus, and a device. A server unidirectionally transmits calling information of a graphics API to a client, so that a requirement for a network latency can be reduced, and proper running of an application program on the server can be ensured in a disconnected network, thereby improving user experience.

According to a first aspect, this application provides a graphics processing method. The method is applied to a server. Specifically, the server is provided with a first graphics library and an application program, the server is connected to a client by using a network, and the client is provided with a second graphics library. The first graphics library includes a plurality of graphics application programming interfaces APIs, the second graphics library includes a plurality of graphics APIs, and at least M graphics APIs in the first graphics library one-to-one correspond to M graphics APIs in the second graphics library. Based on the foregoing configuration environment, the graphics processing method includes the following steps: obtaining a first drawing instruction initiated by the application program; calling a first graphics API in the first graphics library according to the first drawing instruction to execute the first drawing instruction, and sending a first processing notification to the application program, where the first processing notification is used to notify the application program that the first graphics API has been called; generating calling information of the first graphics API, where the calling information of the first graphics API is specifically used to instruct the client to call a first graphics API in the second graphics library, and the calling information of the first graphics API includes a parameter related to the first graphics API and an identifier of the first graphics API; and sending the calling information of the first graphics API to the client.

After the first graphics API corresponding to the first drawing instruction initiated by the application program on the server has been called, the application program may immediately locally obtain the first processing notification used to notify the application program that the first graphics API has been called. Therefore, the application program on the server can run independently without relying on the client, so that even if the client breaks down or the client is disconnected from the server, running of the application program on the server is not affected, and user experience can be improved.

Further, the server generates the calling information of the first graphics API carrying the parameter related to the first graphics API, and sends the calling information of the first graphics API to the client. The client may call the first graphics API in the second graphics library based on the parameter related to the first graphics API. Because the application program on the server has received the first processing notification, after calling the first graphics API in the second graphics library, the client does not need to send a processing notification to the application program on the server. Therefore, unidirectional transmission is implemented between the server and the client, and a requirement for a network latency can be reduced.

In a first possible implementation of the first aspect, the graphics processing method further includes the following step: determining whether an output parameter needs to be returned for the first drawing instruction. When an output parameter needs to be returned for the first drawing instruction, the first processing notification further includes an output parameter generated when the first graphics API is called by the server, and the calling information of the first graphics API includes an input parameter of the first graphics API, the output parameter generated when the first graphics API is called by the server, and the identifier of the first graphics API.

When an output parameter needs to be returned for the first drawing instruction, when the first processing notification further includes the output parameter generated when the first graphics API is called by the server, so that the application program may obtain, by using the first processing notification, the output parameter generated when the first graphics API is called by the server, and when another graphics API whose input parameter is the output parameter of the first graphics API is subsequently called, the obtained output parameter may be used as the input parameter of the another graphics API, thereby ensuring that the application program 104 runs properly.

In addition, the input parameter of the first graphics API, the output parameter generated when the first graphics API is called by the server, and the identifier of the first graphics are included in the calling information that is of the first graphics API and that is sent to the client, so that the client can locally call the first graphics API in the second graphics library based on the input parameter of the first graphics API, the output parameter generated when the first graphics API is called by the server, and the identifier of the first graphics.

According to the first possible implementation of the first aspect, in a second possible implementation, when no output parameter needs to be returned by the first graphics API, the calling information of the first graphics API includes the input parameter of the first graphics API and the identifier of the first graphics API.

When no output parameter needs to be returned for the first drawing instruction, the input parameter of the first graphics API and the identifier of the first graphics API are included in the calling information that is of the first graphics API and that is sent to the client, so that the client can call the first graphics API in the second graphics library based on the input parameter of the first graphics API and the identifier of the first graphics API.

According to the first possible implementation of the first aspect, in a third possible implementation, the graphics processing method further includes the following steps: receiving a second drawing instruction initiated by the application program based on the first processing notification, where the second drawing instruction specifically corresponds to a second graphics API, and an input parameter of the second graphics API is the output parameter generated when the first graphics API is called by the server; calling the second graphics API in the first graphics library according to the second drawing instruction, and sending a second processing notification to the application program, where the second processing notification is specifically used to notify the application program that the second graphics API has been called; generating calling information of the second graphics API, where the calling information of the second graphics API is specifically used to instruct the client to call the second graphics API in the second graphics library, and the calling information of the second graphics API includes a parameter related to the second graphics API and an identifier of the second graphics API; and sending the calling information of the second graphics API to the client.

In the first possible implementation of the first aspect, the first processing notification further includes the output parameter generated when the first graphics API is called by the server. Therefore, the application program can obtain, from the first processing notification, the output parameter generated when the first graphics API is called by the server, call a second graphics API in the first graphics library by using the output parameter generated by the first graphics API as an input parameter of the second graphics API, and send the second processing notification to the application program, so that the application program continues running. Therefore, even if there is a dependency relationship between the second graphics API and the first graphics API, the application program does not need to wait for data returned by the client, thereby saving time, reducing a requirement for a network latency, and improving user experience.

According to the third possible implementation of the first aspect, in a fourth possible implementation, the graphics processing method further includes: storing the calling information of the first graphics API and the calling information of the second graphics API in a first in first out queue, and after a predetermined condition is met, simultaneously sending the calling information of the first graphics API and the calling information of the second graphics API in the first in first out queue to the client.

The application program has a comparatively high running speed. A plurality of groups of calling information are generated per unit of time when the application program runs, and the plurality of groups of calling information are simultaneously sent to the client in a package after the predetermined condition is met. In comparison with sending a group of calling information to the client 20 each time the calling information is generated, in this implementation, the data only needs to be sent to the client once. Therefore, processing overheads can be effectively reduced In a possible implementation, the predetermined condition is that a predetermined time arrives.

In a possible implementation, the predetermined condition is that a size of data in the first in first out queue exceeds a predetermined data size.

In a possible implementation, the graphics processing method further includes the following steps: writing the calling information of the first graphics API and the calling information of the second graphics API into a file, and storing the file.

The client may download the file from the server after a specific time (for example, after a few days), and sequentially read the plurality of groups of calling information that are recorded in the file, to play back a drawn interface of the application program.

According to a second aspect, this application provides a graphics processing method. The method is applied to a client. Specifically, the client is connected to a server by using a network, the server is provided with a first graphics library and an application program, and the client is provided with a second graphics library. The first graphics library includes a plurality of graphics application programming interfaces APIs, the second graphics library includes a plurality of graphics APIs, and at least M graphics APIs in the first graphics library one-to-one correspond to M graphics APIs in the second graphics library. Based on the foregoing configuration environment, the graphics processing method specifically includes the following steps: receiving calling information that is of a first graphics API in the first graphics library and that is sent by the server, where the calling information of the first graphics API specifically includes a parameter related to the first graphics API and an identifier of the first graphics API; and calling a first graphics API in the second graphics library based on the identifier of the first graphics API in the calling information of the first graphics API and the parameter related to the first graphics API in the calling information of the first graphics API.

After the first graphics API in the first graphics library has been called, the server generates the calling information of the first graphics API carrying the parameter related to the first graphics API, and sends the calling information of the first graphics API to the client. The client receives the calling information of the first graphics API from the server, and calls the first graphics API in the second graphics library based on the parameter related to the first graphics API. Because the first graphics API in the first graphics library on the server has been called, after calling the first graphics API in the second graphics library, the client does not need to send a processing notification to the application program on the server. Therefore, unidirectional transmission is implemented between the server and the client, and a requirement for a network latency can be reduced.

In a first possible implementation of the second aspect, the graphics processing method further includes: when the parameter related to the first graphics API in the calling information of the first graphics API includes an output parameter generated when the first graphics API is called by the server, obtaining an output parameter generated when the first graphics API is called by the client; and establishing a mapping relationship between the output parameter generated when the first graphics API is generated by the server and the output parameter generated when the first graphics API is called by the client.

Because the client and the server have different hardware configurations, the output parameter generated when the first graphics API is called by the server is also different from the output parameter generated when the first graphics API is called by the client. When the output parameter generated by the first graphics API is an input parameter of another graphics API, the client cannot directly use, as the input parameter of the another graphics API, the output parameter that is carried in the calling information of the first graphics API and that is generated when the first graphics API is called by the server. Therefore, the client establishes the mapping relationship between the output parameter generated when the first graphics API is called by the server and the output parameter generated when the first graphics API is generated by the client, and the client may query the mapping relationship by using the output parameter generated when the first graphics API is called by the server, to obtain the output parameter generated when the first graphics API is called by the client, and to use, as the input parameter of the another graphics API, the output parameter generated when the first graphics API is called by the client. This overcomes a technical problem that output parameters are different due to the different hardware configurations of the client and the server.

According to the first possible implementation of the second aspect, in a second possible implementation, the method further includes: receiving calling information that is of a second graphics API and that is sent by the server, where the calling information of the second graphics API specifically includes a parameter related to the second graphics API and an identifier of the second graphics API, and an input parameter of the second graphics API is the output parameter generated when the first graphics API is called by the server; determining the second graphics API based on the identifier of the second graphics API; and querying the mapping relationship based on the input parameter of the second graphics API, to obtain a parameter corresponding to the input parameter of the second graphics API in the mapping relationship, where the parameter corresponding to the input parameter of the second graphics API in the mapping relationship is specifically the output parameter generated when the first graphics API is called by the client.

Specifically, when the output parameter generated by the first graphics API is the input parameter of the second graphics API, the client cannot directly use, as the input parameter of the second graphics API, the output parameter that is carried in the calling information of the first graphics API and that is generated when the first graphics API is called by the server. Therefore, the client may query the mapping relationship by using the output parameter generated when the first graphics API is called by the server, to obtain the output parameter generated when the first graphics API is called by the client, and to use, as the input parameter of the second graphics API, the output parameter generated when the first graphics API is called by the client. This overcomes a technical problem that output parameters are different due to the different hardware configurations of the client and the server.

According to the second possible implementation of the second aspect, in a third possible implementation, the method further includes: receiving the calling information of the first graphics API and the calling information of the second graphics API that are simultaneously sent by the server.

The client receives data simultaneously sent by the server, and sequentially reads the calling information of the first graphics API and the calling information of the second graphics API from the data, without separately receiving the calling information of the first graphics API and the calling information of the second graphics API. This can effectively reduce processing overheads.

In a possible implementation of the second aspect, the calling a first graphics API in the second graphics library based on the identifier of the first graphics API in the calling information of the first graphics API and the parameter related to the first graphics API in the calling information of the first graphics API specifically includes: determining the first graphics API based on the identifier of the first graphics API in the calling information of the first graphics API; and calling the first graphics API in the second graphics library based on the parameter related to the first graphics API in the calling information of the first graphics API.

According to a third aspect, this application provides a graphics processing method. The method is applied to a server. Specifically, the server is provided with a first graphics library and an application program, and a client is provided with a second graphics library. The first graphics library includes a plurality of graphics application programming interfaces APIs, the second graphics library includes a plurality of graphics APIs, and at least M graphics APIs in the first graphics library one-to-one correspond to M graphics APIs in the second graphics library. Based on the foregoing configuration environment, the method includes the following steps: obtaining a first drawing instruction initiated by the application program, where the first drawing instruction specifically corresponds to a first graphics API; when determining that the first graphics API is a predetermined graphics API in the first graphics library, refusing to call the first graphics API in the first graphics library; sending a first processing notification to the application program, where the first processing notification is specifically used to notify the application program that the first graphics API has been called; generating calling information of the first graphics API, where the calling information of the first graphics API is specifically used to instruct the client to call the first graphics API in the second graphics library, and the calling information of the first graphics API includes a parameter related to the first graphics API and an identifier of the first graphics API; and sending the calling information of the first graphics API to the client.

When the first graphics API is the predetermined graphics API, the first graphics API corresponding to the first drawing instruction initiated by the application program on the server is refused to be called, and the first processing notification is sent to the application program, to notify the application program that the first graphics API has been called. Therefore, the application program on the server may run independently without relying on the client, so that even if the client breaks down or the client is disconnected from the server, running of the application program on the server is not affected, and user experience can be improved.

In addition, because the server does not need to display a drawn graphic to a user, even if the first graphics API corresponding to the first drawing instruction initiated by the application program on the server is refused to be called and a GPU on the server does not work, user experience is not affected.

Further, the server generates the calling information of the first graphics API carrying the parameter related to the first graphics API, and sends the calling information of the first graphics API to the client. The client may call the first graphics API in the second graphics library based on the parameter related to the first graphics API. Because the application program on the server has received the first processing notification, after calling the first graphics API in the second graphics library, the client does not need to send a processing notification to the application program on the server. Therefore, unidirectional transmission is implemented between the server and the client, and a requirement for a network latency can be reduced.

In a first possible implementation of the third aspect, the calling information of the first graphics API includes an input parameter of the first graphics API and an identifier of the first graphics API.

According to the third aspect or the first possible implementation of the third aspect, in a second possible implementation, the predetermined graphics API includes any one of a shader-starting graphics API, a rasterization-starting graphics API, a buffer-clearing graphics API, or a buffer-swapping graphics API.

When drawing code corresponding to the shader-starting graphics API, the rasterization-starting graphics API, the buffer-clearing graphics API, and the buffer-swapping graphics API is executed, the GPU on the server needs to perform a large amount of computation. When determining that the currently-to-be-called first graphics API is the predetermined graphics API, the first graphics API is refused to be called, so that the GPU can be prevented from performing a large amount of computation, thereby saving precious computing resources on the server. In this case, more application programs can be run on the server.

In a possible implementation, the predetermined graphics API is used to control the GPU on the server to start a shader, start rasterization, clear a buffer, or swap between buffers.

In a possible implementation, the predetermined graphics API is used to control the GPU on the server to perform a large amount of graphics computation.

According to a fourth aspect, this application provides a graphics processing apparatus. The apparatus is included in a server, the server is further provided with a first graphics library and an application program, the server is connected to a client by using a network, and the client is provided with a second graphics library. The first graphics library includes a plurality of graphics application programming interfaces APIs, the second graphics library includes a plurality of graphics APIs, and at least M graphics APIs in the first graphics library one-to-one correspond to M graphics APIs in the second graphics library. The graphics processing apparatus includes: a drawing instruction obtaining module, configured to obtain a first drawing instruction initiated by the application program, where the first drawing instruction specifically corresponds to the first graphics API; a graphics API calling module, configured to call a first graphics API in the first graphics library according to the first drawing instruction to execute the first drawing instruction, and send a first processing notification to the application program, where the first processing notification is specifically used to notify the application program that the first graphics API has been called; a calling information generation module, configured to generate calling information of the first graphics API, where the calling information of the first graphics API is specifically used to instruct the client to call a first graphics API in the second graphics library, and the calling information of the first graphics API includes a parameter related to the first graphics API and an identifier of the first graphics API; and a calling information sending module, configured to send the calling information of the first graphics API to the client.

The fourth aspect or any implementation of the fourth aspect is an apparatus implementation corresponding to any one of the first aspect or the implementations of the first aspect. The description in any one of the first aspect or the implementations of the first aspect is applicable to the fourth aspect or any implementation of the fourth aspect. Details are not described herein.

According to a fifth aspect, this application provides a graphics processing apparatus. The apparatus is included in a client, the client is connected to a server by using a network, the server is provided with a first graphics library, and the client is provided with a second graphics library. The first graphics library includes a plurality of graphics application programming interfaces APIs, the second graphics library includes a plurality of graphics APIs, and at least M graphics APIs in the first graphics library one-to-one correspond to M graphics APIs in the second graphics library. The graphics processing apparatus includes: a calling information receiving module, configured to receive calling information that is of a first graphics API and that is sent by the server, where the calling information of the first graphics API includes a parameter related to the first graphics API and an identifier of the first graphics API; and a graphics API calling module, configured to determine the first graphics API based on the identifier of the first graphics API in the calling information of the first graphics API, and call the first graphics API in the second graphics library based on the parameter related to the first graphics API in the calling information of the first graphics API.

The fifth aspect or any implementation of the fifth aspect is an apparatus implementation corresponding to any one of the second aspect or the implementations of the second aspect. The description in any one of the second aspect or the implementations of the second aspect is applicable to the fifth aspect or any implementation of the fifth aspect. Details are not described herein.

According to a sixth aspect, this application provides a graphics processing apparatus. The apparatus is included in a server, the server is further provided with a first graphics library and an application program, the server is connected to a client by using a network, and the client is provided with a second graphics library. The first graphics library includes a plurality of graphics application programming interfaces APIs, the second graphics library includes a plurality of graphics APIs, and at least M graphics APIs in the first graphics library one-to-one correspond to M graphics APIs in the second graphics library. The graphics processing apparatus includes: a drawing instruction obtaining module, configured to obtain a first drawing instruction initiated by the application program, where the first drawing instruction corresponds to a first graphics API; a graphics API calling module, configured to: when determining that the first graphics API is a predetermined graphics API in the first graphics library, refuse to call a first graphics API in the first graphics library; where the graphics API calling module is further configured to send a first processing notification to the application program, where the first processing notification is used to notify the application program that the first graphics API has been called; a calling information generation module, configured to generate calling information of the first graphics API, where the calling information of the first graphics API is specifically used to instruct the client to call a first graphics API in the second graphics library, and the calling information of the first graphics API includes a parameter related to the first graphics API and an identifier of the first graphics API; and a calling information sending module, configured to send the calling information of the first graphics API to the client.

The sixth aspect or any implementation of the sixth aspect is an apparatus implementation corresponding to any one of the third aspect or the implementations of the third aspect. The description in any one of the third aspect or the implementations of the third aspect is applicable to the sixth aspect or any implementation of the sixth aspect. Details are not described herein.

According to a seventh aspect, this application provides a server, including a processor and a memory. The memory stores a program instruction, and the processor runs the program instruction to perform the graphics processing method in any one of the first aspect or the implementations of the first aspect.

According to an eighth aspect, this application provides a client, including a processor and a memory. The memory stores a program instruction, and the processor runs the program instruction to perform the graphics processing method in any one of the second aspect or the implementations of the second aspect.

According to a ninth aspect, this application provides a server, including a processor and a memory. The memory stores a program instruction, and the processor runs the program instruction to perform the graphics processing method in any one of the third aspect or the implementations of the third aspect.

According to a tenth aspect, this application provides a storage medium. The storage medium stores a program instruction. When the program instruction is run by a storage controller, the storage controller performs the graphics processing method in any one of the first aspect or the implementations of the first aspect. The storage medium includes but is not limited to a read-only memory, a random access memory, a flash memory, an HDD, or an SSD.

According to an eleventh aspect, this application provides a storage medium. The storage medium stores a program instruction. When the program instruction is run by a storage controller, the storage controller performs the graphics processing method in any one of the second aspect or the implementations of the second aspect. The storage medium includes but is not limited to a read-only memory, a random access memory, a flash memory, an HDD, or an SSD.

According to a twelfth aspect, this application provides a storage medium. The storage medium stores a program instruction. When the program instruction is run by a storage controller, the storage controller performs the graphics processing method in any one of the third aspect or the implementations of the third aspect. The storage medium includes but is not limited to a read-only memory, a random access memory, a flash memory, an HDD, or an SSD.

According to a thirteenth aspect, this application provides a computer program product. The computer program product includes a program instruction. When the computer program product is executed by a storage controller, the storage controller performs the graphics processing method in any one of the first aspect or the implementations of the first aspect. The computer program product may be a software installation package. When the graphics processing method in any one of the first aspect or the implementations of the first aspect needs to be used, the computer program product may be downloaded to a storage controller, and the computer program product is run on the storage controller.

According to a fourteenth aspect, this application provides a computer program product. The computer program product includes a program instruction. When the computer program product is executed by a storage controller, the storage controller performs the graphics processing method in any one of the second aspect or the implementations of the second aspect. The computer program product may be a software installation package. When the graphics processing method in any one of the second aspect or the implementations of the second aspect needs to be used, the computer program product may be downloaded to a storage controller, and the computer program product is run on the storage controller.

According to a thirteenth aspect, this application provides a computer program product. The computer program product includes a program instruction. When the computer program product is executed by a storage controller, the storage controller performs the graphics processing method in any one of the third aspect or the implementations of the third aspect. The computer program product may be a software installation package. When the graphics processing method in any one of the third aspect or the implementations of the third aspect needs to be used, the computer program product may be downloaded to a storage controller, and the computer program product is run on the storage controller.

DESCRIPTION OF EMBODIMENTS

The technical solutions according to embodiments of the present invention are clearly described in the following with reference to the accompanying drawings. Definitely, the described embodiments are merely some but not all of the embodiments of the present invention.

Figure 1:
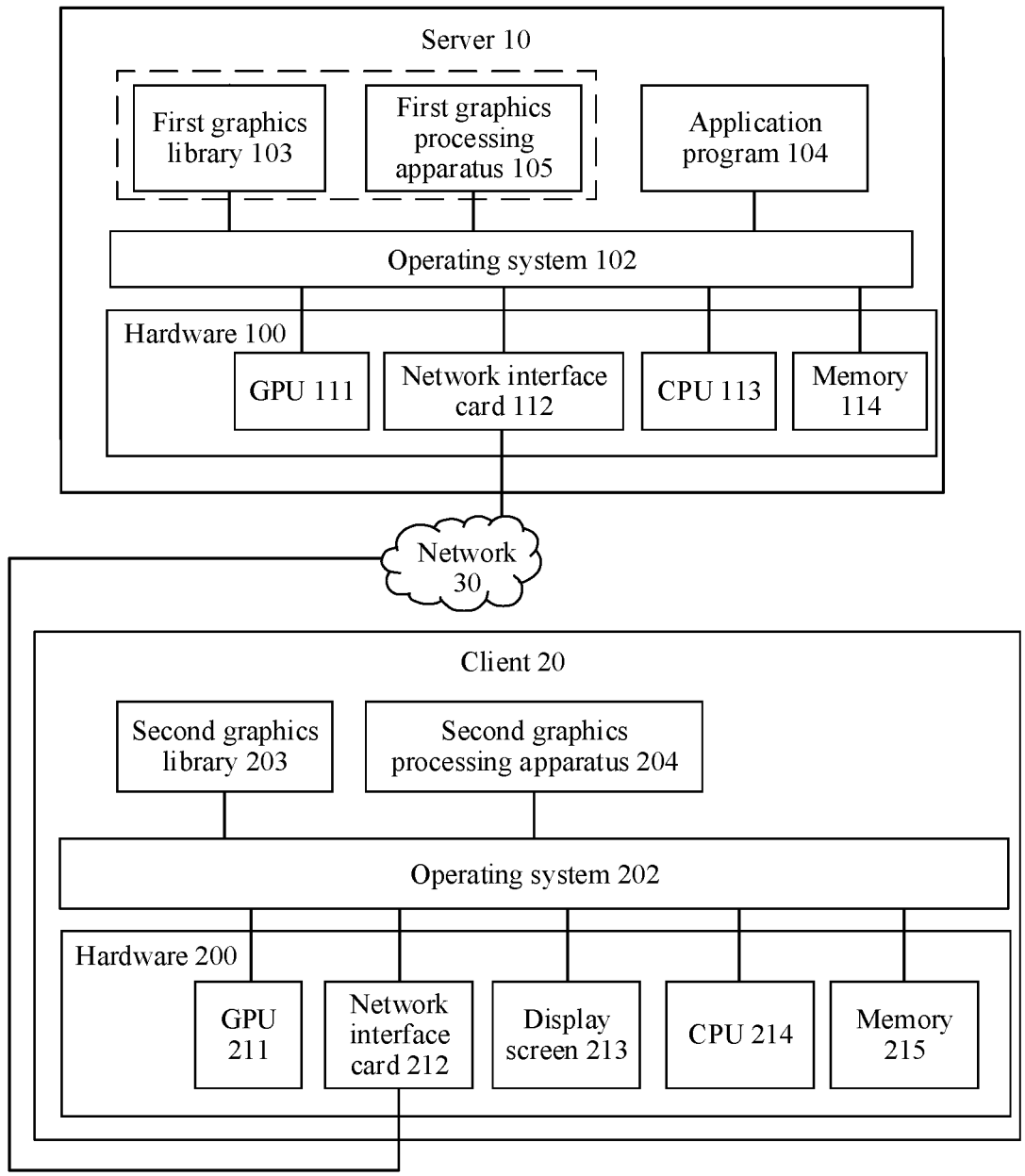
FIG. 1 is a schematic structural diagram of a remote interface display system according to an embodiment of the present invention.

FIG. 1 is a schematic structural diagram of a remote interface display system according to an embodiment of the present invention. As shown in FIG. 1, the remote interface display system includes a server 10 and a client 20, and the client 20 is connected to the server 10 by using a network 30.

The server 10 includes hardware 100, an operating system 102, a first graphics library 103, an application program 104, and a first graphics processing apparatus 105. The hardware 10 is provided with a GPU 111, a network interface card 112, a CPU 113, and a memory 114.

It should be noted that, in some other examples, the server 10 may be provided with no GPU 111, the CPU 113 simulates the GPU 111, and the CPU 113 implements a drawing function of the GPU 111.

The first graphics library 103 is provided with a plurality of graphics APIs, and each graphics API correspond to specific drawing code. The drawing code is used to control the GPU 111 to perform drawing, for example, handle application, graphics rendering, shadering, buffer update, and image display. The application program 104 loads the first graphics library 103, and the application program 104 may directly call a graphics API in the loaded first graphics library 103 during running.

The operating system 102 is provided with a network interface card driver of the network interface card 112. The first graphics processing apparatus 105 may control, based on the network interface card driver of the network interface card 112, the network interface card 112 to receive or send data by using the network 30. The operating system 102 is further provided with a video card driver of the GPU 111. The application program 104 and the first graphics processing apparatus 105 control, based on the video card driver of the GPU 111, the GPU 111 to perform drawing.

The first graphics library 103, the application program 104, and the first graphics processing apparatus 105 all are run on the operating system 102. The first graphics library 103 may be, for example, an Opengl graphics library, a Vulkan graphics library, or another graphics library.

For example, the first graphics library 103 is an Opengl graphics library, and a graphics API in the first graphics library 103 may be eglCreateWindowSurface, eglCreateContext, glCreateShader, glCompileShader, glGenBuffers, glBufferData, glDrawArrays, or eglSwapBuffers.

eglCreateWindowSurface is used to apply for a graphics buffer, eglCreateContext is used to apply for a context handle, glCreateShader is used to apply for a shader handle, glCompileShader is used to compile a shader, glGenBuffers is used to apply for a vertex and texture buffer handle, glBufferData is used to send vertex and texture data to the client, glDrawArrays is used to start drawing pixels to a back buffer, and eglSwapBuffers is used to swap between a front buffer and the back buffer.

In this embodiment of the present invention, the application program 104 is an application program that is of the client 20 and that is deployed on the server 10, for example, a 2D game, a 3D game, a mailbox, and social software.

In this embodiment of the present invention, after the application program 104 is started, N graphics APIs in the first graphics library 103 may be sequentially called according to program instruction of the application program 104. A calling sequence of the N graphics APIs is pre-recorded in the program instruction of the application program 104.

In some other examples, the program instruction may also be set to enable the application program 104 to cyclically call the N graphics APIs.

Figure 2:
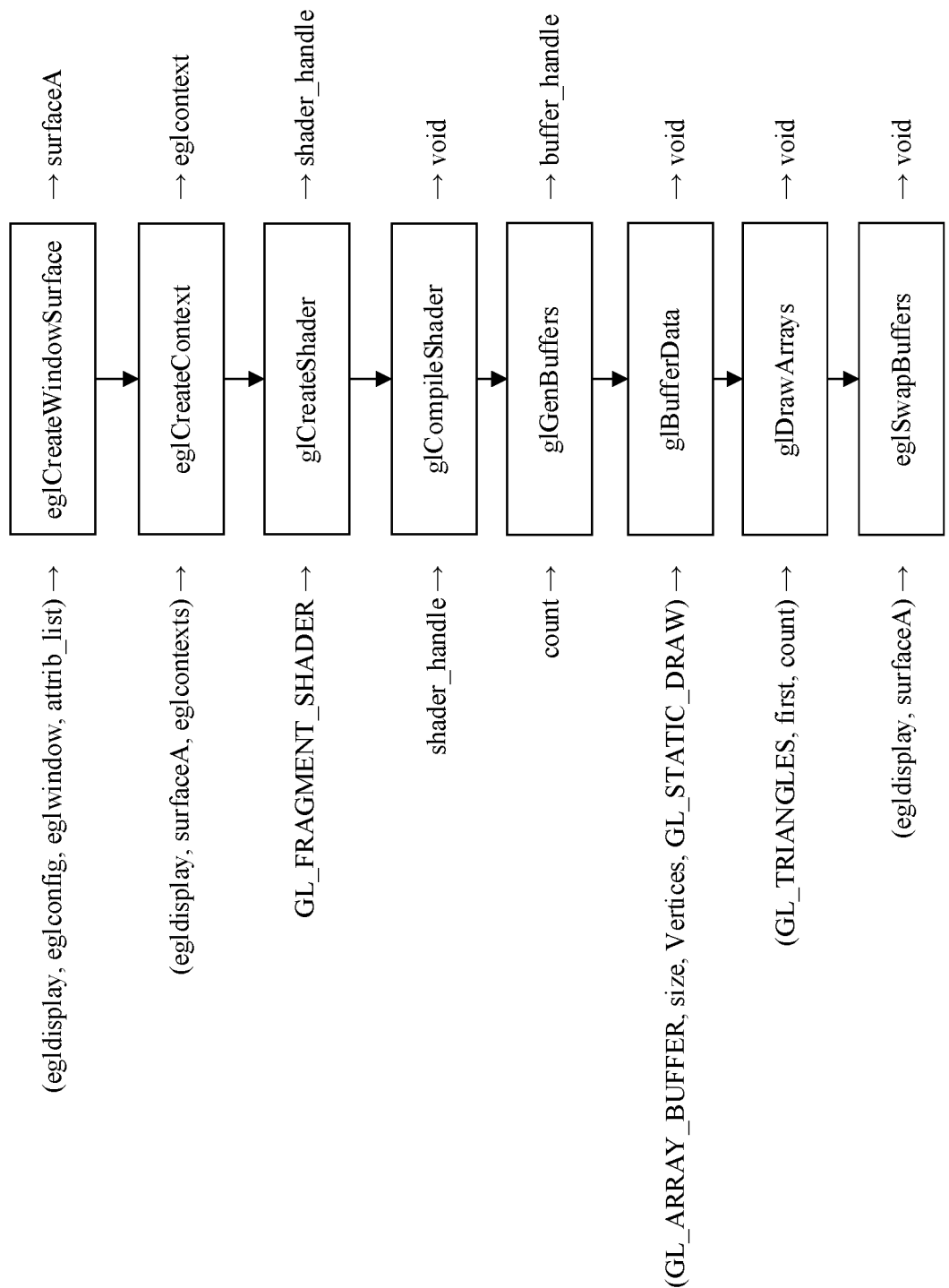
FIG. 2 is a schematic diagram of calling a graphics API by an application program according to an embodiment of the present invention.

For example, further refer to FIG. 2. FIG. 2 is a schematic diagram of calling a graphics API by an application program according to an embodiment of the present invention. As shown in FIG. 2, the application program 104 sequentially calls graphics APIs in the first graphics library 103 according to program instruction of the application program 104: eglCreateWindowSurface, eglCreateContext, glCreateShader, glCompileShader, glGenBuffers, glBufferData, glDrawArrays, and eglSwapBuffers.

In addition, in the process of calling the graphics APIs, an output parameter is generated for each of eglCreateWindowSurface, eglCreateContext, glCreateShader, and glGenBuffers; and no output parameter is generated for glCompileShader, glBufferData, glDrawArrays, and eglSwapBuffers, which is represented by void.

In addition, there is a dependency relationship between some graphics APIs. To be specific, input parameters of some graphics APIs are output parameters of other graphics APIs. For example, for eglCreateContext, one of input parameters surfaceA is an output parameter of eglCreateWindowSurface. For glCompileShader, an input parameter shader_handle is an output parameter of glCreateshader. For eglSwapBuffers, one of input parameters surfaceA is an output parameter of eglCreateWindowSurface.

Further, input parameters of graphics APIs shown in FIG. 2: egldisplay, eglconfig, eglwindow, attrib_list, eglcontexts, GL_FRAGMENT_SHADER, count, GL_ARRAY_BUFFER, size, Vertices, GL_STATIC_DRAW, GL_TRIANGLES, and first all are constants. Specific values of the input parameters are pre-recorded in the program instruction.

In a programming process performed by a programmer, an input parameter that is a constant is pre-recorded in program instruction, and the application program 104 may directly obtain the input parameter from the program instruction when calling a graphics API. However, when an input parameter of a currently-to-be-called graphics API is an output parameter of another graphics API, that is, when there is a dependency relationship between the currently-to-be-called graphics API and the another graphics API, the application program 104 can use, only after the another graphics API has been called, the output parameter returned by the another graphics API as the input parameter of the currently-to-be-called graphics API, to call the currently-to-be-called graphics API.

For example, still referring to FIG. 2, for glCreateShader, an input parameter GL_FRAGMENT_SHADER may be directly obtained from the program instruction; and for glCompileShader, an input parameter shader_handle is an output parameter of glCreateShader, and therefore, the application program 104 can use, only after glCreateShader has been called, the output parameter shader_handle generated by glCreateShader as the input parameter of glCompileShader, to call glCompileShader.

It should be noted that, in some examples, the first graphics library 103 may be a third-party graphics library. In some other examples, the first graphics library 103 may be a user-defined graphics library. In this case, the first graphics processing apparatus 105 may be integrated with the first graphics library 103, and this is represented by a dashed block in FIG. 1.

The following describes the client 20. As shown in FIG. 1, the client 20 includes hardware 200, an operating system 202, a second graphics library 203, and a second graphics processing apparatus 204. The hardware 200 is provided with a GPU 211, a network interface card 212, a display screen 213, a CPU 214, and a memory 215.

It should be noted that, in some other examples, the client 20 may be provided with no GPU 211, the CPU 214 simulates the GPU 211, and the CPU 214 implements a drawing function of the GPU 211.

Similar to the first graphics library 103, the second graphics library 203 is also provided with a plurality of graphics APIs, and each graphics API of the second graphics library 203 corresponds to specific drawing code. The second graphics processing apparatus 204 loads the second graphics library 203, and the second graphics processing apparatus 204 may directly call a graphics API in the loaded second graphics library 203, to control the GPU 211 to perform drawing.

The operating system 202 is provided with a network interface card driver of the network interface card 212. The second graphics processing apparatus 204 may control, based on the network interface card driver of the network interface card 212, the network interface card 212 to receive or send data by using the network 30. The operating system 202 is further provided with a video card driver of the GPU 211. The second graphics processing apparatus 204 controls, by using the video card driver of the GPU 211, the GPU 211 to perform drawing. The operating system 202 is further provided with a display screen driver of the display screen 213. When the GPU 211 needs to display a drawn interface, the display screen driver controls the display screen 213 to display the drawn interface.

Both the second graphics library 203 and the second graphics processing apparatus 204 are run on the operating system 202. The second graphics library 203 may be, for example, an Opengl graphics library, a Vulkan graphics library, or another common graphics library.

For example, similar to the first graphics library 103, when the second graphics library 203 is an Opengl graphics library, a graphics API in the second graphics library 203 may be eglCreateWindowSurface, eglCreateContext, glCreateShader, glCompileShader, glGenBuffers, glBufferData, glDrawArrays, or eglSwapBuffers.

Functions of the foregoing graphics APIs are described above, and are not described herein again.

In this embodiment of the present invention, the first graphics library 103 and the second graphics library 203 are graphics libraries of a same type, and at least M graphics APIs in the first graphics library 103 one-to-one correspond to M graphics APIs in the second graphics library 203.

For example, both the first graphics library 103 and the second graphics library 203 are Opengl graphics libraries, and are provided with a same graphics API eglCreateWindowSurface. A function of eglCreateWindowSurface in the first graphics library 103 is the same as a function of eglCreateWindowSurface in the second graphics library 203, and both are used to apply for a graphics buffer, but an implementation detail of eglCreateWindowSurface in the first graphics library 103 may be different from an implementation detail of eglCreateWindowSurface in the second graphics library 203. Specifically, eglCreateWindowSurface in the first graphics library 103 may be implemented in C++, and eglCreateWindowSurface in the second graphics library 203 may be implemented in Java. In this embodiment of the present invention, although the implementation detail of eglCreateWindowSurface in the first graphics library 103 may be different from the implementation detail of eglCreateWindowSurface in the second graphics library 203, because eglCreateWindowSurface in the first graphics library 103 and eglCreateWindowSurface in the second graphics library 203 have a same function and are included in graphics libraries of a same type, there is a one-to-one correspondence between eglCreateWindowSurface in the first graphics library 103 and eglCreateWindowSurface in the second graphics library 203, and eglCreateWindowSurface in the first graphics library 103 and eglCreateWindowSurface in the second graphics library 203 may be referred to as same graphics APIs.

Likewise, there is also a one-to-one correspondence between eglCreateContext in the first graphics library 103 and eglCreateContext in the second graphics library 203, between glCreateShader in the first graphics library 103 and glCreateShader in the second graphics library 203, between glCompileShader in the first graphics library 103 and glCompileShader in the second graphics library 203, between glGenBuffers in the first graphics library 103 and glGenBuffers in the second graphics library 203, between glBufferData in the first graphics library 103 and glBufferData in the second graphics library 203, between glDrawArrays in the first graphics library 103 and glDrawArrays in the second graphics library 203, or between eglSwapBuffers in the first graphics library 103 and eglSwapBuffers in the second graphics library 203.

It should be noted that, the graphics APIs described above are only some graphics APIs in the Opengl graphics library. This embodiment of the present invention is also applicable to another graphics API in the Opengl graphics library, and may be applicable to a graphics API in a Vulkan graphics library or another common graphics library, provided that the server 10 and the client 20 have graphics libraries of a same type.

In this embodiment of the present invention, the application program 104 pre-loads the first graphics library 103. After pre-loading the first graphics library 103, the application program 104 learns of a function address of a graphics API in the first graphics library 103. When the application program 104 calls the graphics API in the first graphics library 103, the application program 104 initiates a drawing instruction carrying an input parameter and a jump instruction that are of the graphics API. The jump instruction is used to jump to a function address of a to-be-called graphics API, and the application program 104 jumps to the function address according to the jump instruction and executes drawing code at the function address based on the input parameter.

Further, the second graphics processing apparatus 204 pre-loads the second graphics library 203. After pre-loading the second graphics library 203, the second graphics processing apparatus 204 learns of a function address of a graphics API in the second graphics library 203. When calling the graphics API in the second graphics library 203, the second graphics processing apparatus 204 initiates a drawing instruction carrying an input parameter and a jump instruction that are of the graphics API. The jump instruction is used to jump to a function address of the graphics API, and the second graphics processing apparatus 204 jumps to the function address according to the jump instruction and executes drawing code at the function address based on the input parameter.

In some examples, if a graphics API is compiled in C++, the graphics API is specifically represented as a function address of the to-be-called graphics API on the server 10. The function address is specifically a memory address.

In some other examples, if a graphics API is compiled in Java, the graphics API is specifically represented as a function, a method, or an object of a to-be-called graphics API on the server 10. A java virtual machine translates the function, the method, or the object of the graphics API into a function address on the server 10.

It should be noted that, in this embodiment of the present invention, a function address is used as an example to describe the graphics API.

Figure 3A:
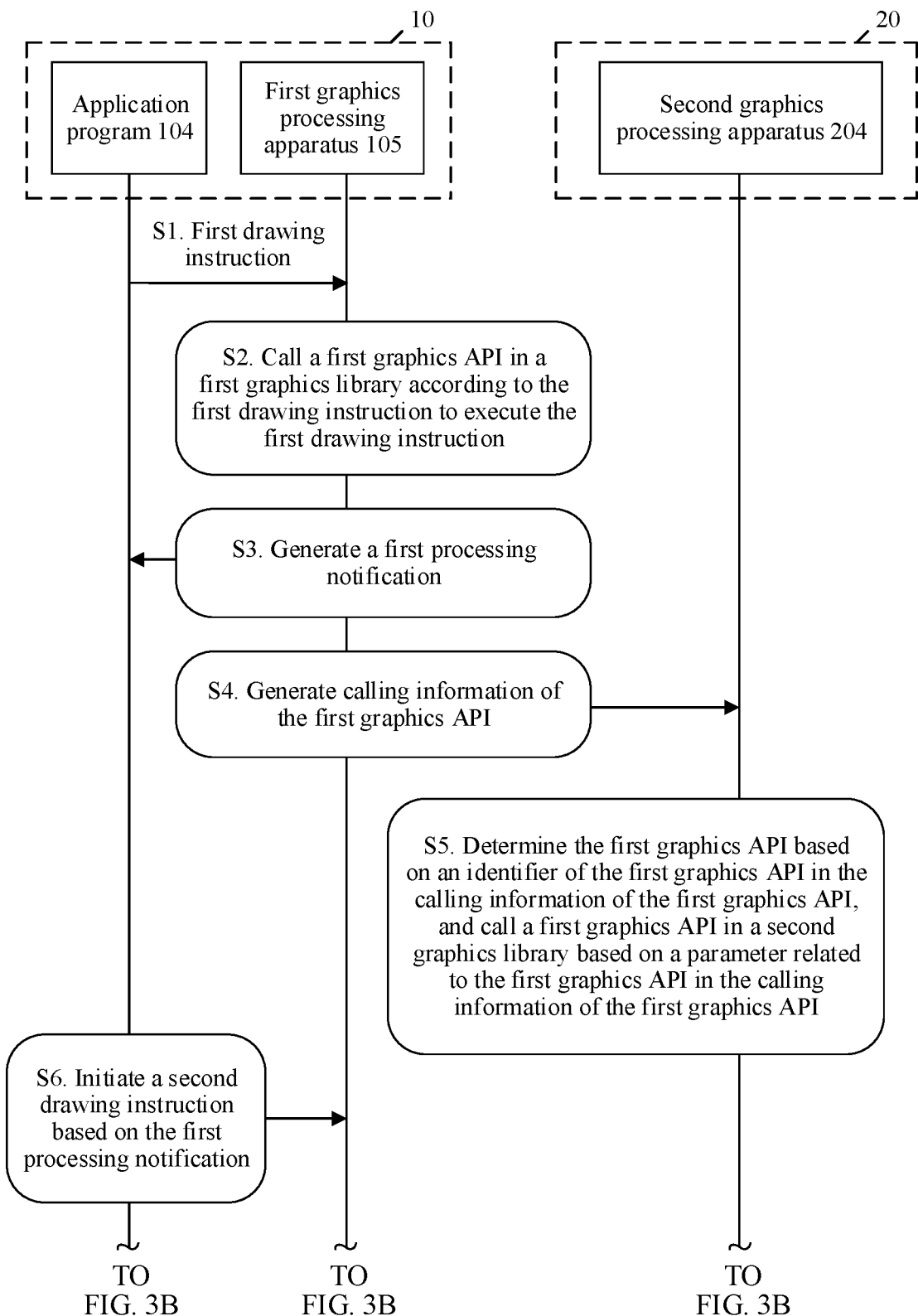
FIG. 3A and FIG. 3B are a data exchange diagram of a graphics processing method according to an embodiment of the present invention.
Figure 3B:
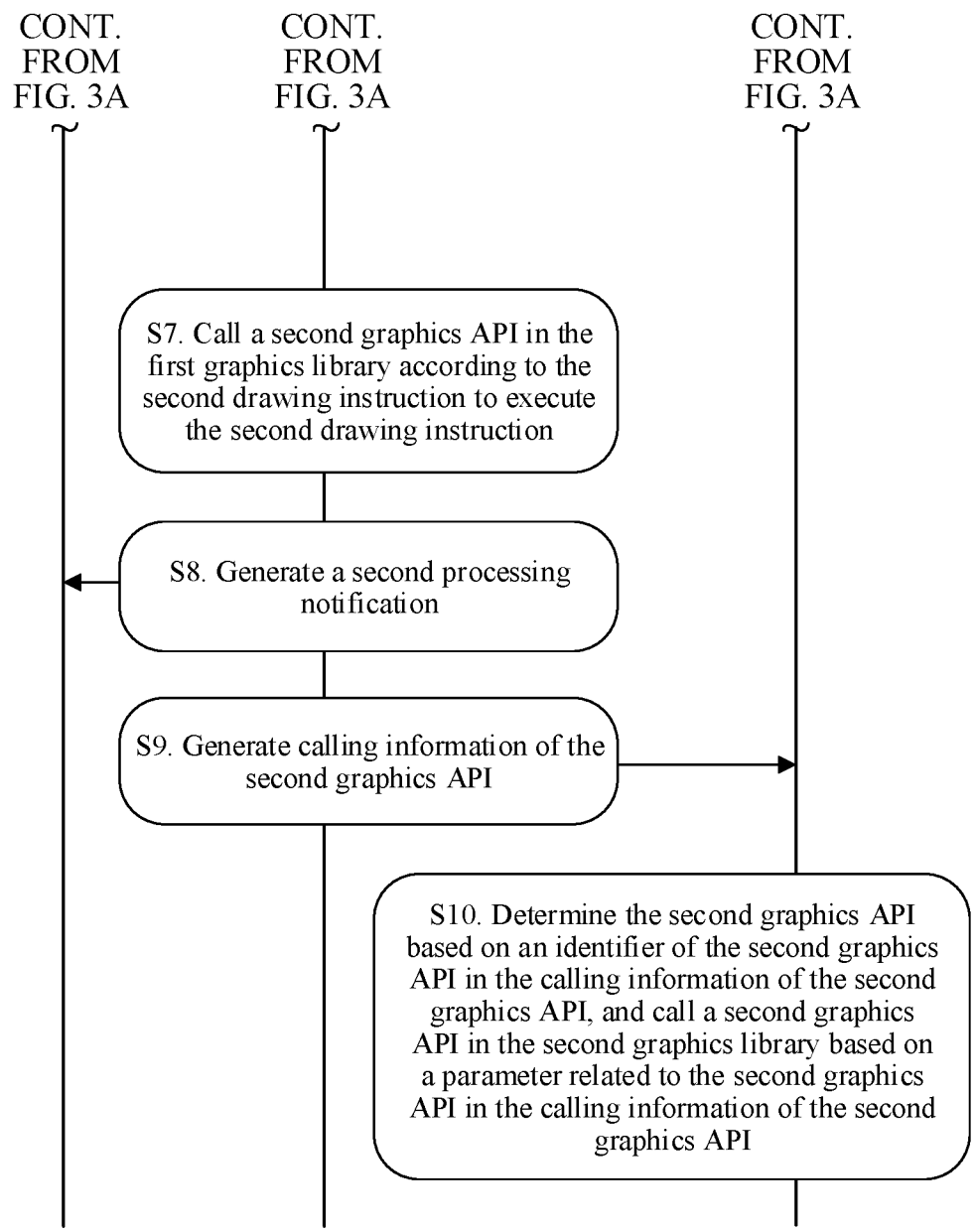

For further clear description, refer to FIG. 3A and FIG. 3B below. FIG. 3A and FIG. 3B are a data exchange diagram of a graphics processing method according to an embodiment of the present invention. As shown in FIG. 3A and FIG. 3B, the graphics processing method according to this embodiment of the present invention includes the following steps.

Step S1: The application program 104 initiates a first drawing instruction, and the first graphics processing apparatus 105 obtains the first drawing instruction, where the first drawing instruction corresponds to a first graphics API, and the first drawing instruction carries an input parameter of the first graphics API and a jump instruction that is used to jump to a function address of the first graphics API.

The first drawing instruction corresponds to a first graphics API in the first graphics library 103 and/or a first graphics API in the second graphics library 203.

After initiating the first drawing instruction, the application program 104 waits until an execution result of the first drawing instruction is obtained, and then can continue running.

In some examples, when the application program 104 initiates the first drawing instruction, and executes the first drawing instruction to jump to the function address to which the jump instruction is intended to jump, the first graphics processing apparatus 105 intercepts the first drawing instruction by using a hook.

Step S2: The first graphics processing apparatus 105 calls the first graphics API in the first graphics library 103 according to the first drawing instruction to execute the first drawing instruction.

The first graphics processing apparatus 105 jumps to the function address of the first graphics API according to the jump instruction carried in the first drawing instruction, and executes drawing code at the function address of the first graphics API based on the input parameter of the first graphics API that is carried in the first drawing instruction. When the drawing code is executed, the GPU 111 may be controlled to perform image rendering, so as to complete calling of the first graphics API in the first graphics library and execution of the first drawing instruction.

In this step, before calling the first graphics API in the first graphics library according to the first drawing instruction, the first graphics processing apparatus 105 may further confirm whether the first graphics API is a predetermined graphics API in the first graphics library. When the predetermined graphics API is called, the GPU 111 needs to perform a large amount of computation.

In this step, when determining that the first graphics API is not the predetermined graphics API in the first graphics library, the first graphics processing apparatus 105 calls the first graphics API in the first graphics library according to the first drawing instruction to execute the first drawing instruction. When determining that the first graphics API is the predetermined graphics API in the first graphics library, the first graphics processing apparatus 105 refuses to call the first graphics API in the first graphics library.

Step S3: The first graphics processing apparatus 105 generates a first processing notification, and sends the first processing notification to the application program 104, where the first processing notification is used as the execution result of the first drawing instruction and is used to notify the application program 104 that the first graphics API has been called.

In this step, the first graphics processing apparatus 105 may further determine whether an output parameter needs to be returned for the first drawing instruction. When an output parameter needs to be returned for the first drawing instruction, the first processing notification further includes an output parameter generated when the first graphics API is called by the server.

When an output parameter needs to be returned for the first drawing instruction, when the first processing notification further carries the output parameter generated when the first graphics API is called by the server 10, so that the application program 104 may obtain, by using the first processing notification, the output parameter generated when the first graphics API is called by the server 10. When the application program subsequently calls another graphics API whose input parameter is the output parameter of the first graphics API, the obtained output parameter may be used as the input parameter of the another graphics API, thereby ensuring that the application program 104 runs properly.

In addition, when the first graphics processing apparatus 105 determines that the first graphics API is the predetermined graphics API in the first graphics library 103, and refuses to call the first graphics API in the first graphics library 103 in step S3, the first graphics processing apparatus 105 still generates the first processing notification used to notify the application program 104 that the first graphics API has been called, and sends the first processing notification to the application program 104.

The predetermined graphics API is a graphics API for which the GPU 111 needs to perform a large amount of computation.

The graphics API includes any one of a shader-starting graphics API, a rasterization-starting graphics API, a buffer-clearing graphics API, or a buffer-swapping graphics API.

It should be noted that, when drawing code corresponding to the shader-starting graphics API, the rasterization-starting graphics API, the buffer-clearing graphics API, and the buffer-swapping graphics API is executed, the GPU 111 needs to start a shader, start rasterization, clear a buffer, and swap between buffers. These operations make the GPU 111 perform a large amount of computation. When determining that the currently-to-be-called first graphics API is the predetermined graphics API, the first graphics processing apparatus 105 refuses to call the first graphics API, so that the GPU 111 can be prevented from performing a large amount of computation, thereby saving precious computing resources on the server 10.

For example, in an Opengl graphics library, glDrawArrays is used to start to draw pixels to a back buffer. When drawing the pixels to the back buffer, a shader needs to be started, and rasterization is started by the shader. In this case, glDrawArrays acts as both a shader-starting graphics API and a rasterization-starting graphics API. eglSwapBuffers is used to swap between a front buffer and the back buffer. In this case, eglSwapBuffers is a buffer-swapping graphics API. glDrawElements is used to start to draw, and the shader is started during drawing. In this case, glDrawElements is also a shader-starting graphics API. glClearDepthf and glClearColor are used to clear a buffer. In this case, both glClearDepthf and glClearColor are buffer-clearing graphics APIs.

Because when determining that the first graphics API is the predetermined graphics API in the first graphics library 103, the first graphics processing apparatus 105 refuses to call the first graphics API in the first graphics library 103, the GPU 111 does not need to start a shader, start rasterization, clear a buffer, or swap between buffers, so as to implement empty rendering. However, in this embodiment of the present invention, the first graphics processing apparatus 105 still generates the first processing notification used to notify the application program 104 that the first graphics API has been called, and sends the first processing notification to the application program 104, so that the application program 104 can still obtain the first processing notification to end waiting and continue running.

Because the server 10 does not need to display a drawn graphic to a user, user experience is not affected even if the GPU 111 of the server 10 does not work.

Therefore, the foregoing disclosed empty rendering may prevent the GPU 111 from performing a large amount of computation, thereby saving precious computing resources on the server 10. In this case, more application programs can be run on the server 10.

Step S4: The first graphics processing apparatus 105 generates calling information of the first graphics API, and sends the calling information of the first graphics API to the second graphics processing apparatus 204 on the client 20 by using the network 30.

The calling information of the first graphics API is used to instruct the client to call the first graphics API in the second graphics library, and the calling information of the first graphics API includes an identifier of the first graphics API and a parameter related to the first graphics API that is in the first graphics library 103 and that is called by the server 10.

Optionally, the parameter related to the first graphics API may include the input parameter of the first graphics API, or the parameter related to the first graphics API may include the input parameter and the output parameter of the first graphics API.

In the first graphics library 103 and the second graphics library 203, some graphics APIs have only input parameters but no output parameters. Using the Opengl graphics library as an example, the graphics API glDrawArrays used to start to draw the pixels to the back buffer has input parameters including GL_TRIANGLES, first, and count, and has no output parameter. However, some other graphics APIs have both input parameters and output parameters. For example, the graphics API eglCreateWindowSurface used to apply for a graphics buffer has input parameters including egldisplay, eglconfig, eglwindow, and attrib list, and has an output parameter surfaceA.

The input parameter and the output parameter are specifically values, register addresses, or memory addresses. For example, surfaceA is a handle of a graphics buffer defined in the Opengl graphics library, namely, a memory address of the graphics buffer that has been applied for, and a specific value of surfaceA depends on usage of the memory 114 of the server 10. For example, if the memory 114 of the server 10 has free memory space, an entry address in the free memory space may be allocated to surfaceA.

Further, when both the first graphics library 103 and the second graphics library 203 are Opengl graphics libraries, a correspondence between a function address of a graphics API in the first graphics library 103 on the server 10 and an identifier is listed in the following Table 1 by using an example.

TABLE 1

| Function address of a graphics API on the server 10 | Identifier |
| --- | --- |
| Function address A of eglCreateWindowSurface on the server 10 | 0001 |
| Function address B of eglCreateContext on the server 10 | 0002 |
| Function address C of glCreateShader on the server 10 | 0003 |
| Function address D of glCompileShader on the server 10 | 0004 |
| Function address E of glGenBuffers on the server 10 | 0005 |
| Function address F of glBufferData on the server 10 | 0006 |
| Function address G of glDrawArrays on the server 10 | 0007 |

TABLE 1-continued

| Function address of a graphics API on the server 10 | Identifier |
|---|---|
| Function address H of eglSwapBuffers on the server 10 | 0008 |
| Function address I of the first graphics API on the server 10 | 0009 |
| Function address J of a second graphics API on the server 10 | 000A |
| ... | ... |

Table 1 may be maintained by the first graphics processing apparatus 105 on the server 10. For example, in Table 1, the function address A of eglCreateWindowSurface on the server 10 is specifically an entry address that is allocated from the memory 114 of the server 10 to the graphics API eglCreateWindowSurface, where drawing code corresponding to the entry address is executed after the application program 104 loads the first graphics library 103.

The entry address allocated from the memory 114 of the server 10 to eglCreateWindowSurface may be 0x00000001. When calling eglCreateWindowSurface in the first graphics library 103, the application program 104 directly jumps to the memory address 0x00000001 of the server 10, and executes, from 0x00000001, the drawing code corresponding to eglCreateWindowSurface.

Therefore, in this step, when an output parameter needs to be returned for the first drawing instruction, the parameter related to the first graphics API includes the input parameter of the first graphics API and the output parameter generated when the first graphics API is called by the server, and the calling information of the first graphics API includes the input parameter of the first graphics API, the output parameter generated when the first graphics API is called by the server, and the identifier of the first graphics API.

When an output parameter does not need to be returned for the first drawing instruction, the parameter related to the first graphics API includes the input parameter of the first graphics API, and the calling information of the first graphics API includes the input parameter of the first graphics API and the identifier of the first graphics API.

Further, when the first graphics processing apparatus 105 determines that the first graphics API is the predetermined graphics API in the first graphics library 103, and refuses to call the first graphics API in the first graphics library 103, the parameter related to the first graphics API includes the input parameter of the first graphics API, and the calling information of the first graphics API includes the input parameter of the first graphics API and the identifier of the first graphics API.

It should be noted that, the identifier listed in Table 1 is merely an example for description, provided that the identifier in the graphics library is unique. In some other examples, a name of a graphics API may be used as an identifier, for example, eglCreateWindowSurface.

Step S5: The second graphics processing apparatus 204 receives the calling information of the first graphics API, determines the first graphics API based on the identifier of the first graphics API in the calling information of the first graphics API, and calls the first graphics API in the second graphics library 203 based on the parameter related to the first graphics API in the calling information of the first graphics API.

In this embodiment of the present invention, the second graphics processing apparatus 204 pre-records a correspondence between a graphics API and an identifier of the graphics API. For example, a correspondence between the identifier listed in the second column in Table 1 above and a function addresses of a graphics API in the second graphics library 203 on the client 20 is listed in Table 2 below.

TABLE 2

| Identifier | Function address of a graphics API on the client 20 |
|---|---|
| 0001 | Function address A' of eglCreateWindowSurface on the client 20 |
| 0002 | Function address B' of eglCreateContext on the client 20 |
| 0003 | Function address C' of glCreateShader on the client 20 |
| 0004 | Function address D' of glCompileShader on the client 20 |
| 0005 | Function address E' of glGenBuffers on the client 20 |
| 0006 | Function address F' of glBufferData on the client 20 |
| 0007 | Function address G' of glDrawArrays on the client 20 |
| 0008 | Function address H' of eglSwapBuffers on the client 20 |
| 0009 | Function address I' of the first graphics API on the client 20 |
| 000A | Function address J' of the second graphics API on the client 20 |

Table 2 may be maintained by the second graphics processing apparatus 204 on the client 20. For example, in Table 2, the function address A' of eglCreateWindowSurface on the client 20 is specifically an entry address that is allocated from the memory 215 on the client 20 to the graphics API eglCreateWindowSurface, where drawing code corresponding to the entry address is executed after the second graphics processing apparatus 204 loads the second graphics library 203.

For example, a memory entry address allocated from the memory 215 on the client 20 to eglCreateWindowSurface may be 0xA000100F. When calling eglCreateWindowSurface in the second graphics library 203, the second graphics processing apparatus 204 directly jumps to the memory address 0xA000100F of the client 20, and executes, from 0xA000100F, the drawing code corresponding to eglCreateWindowSurface.

In this step, the second graphics processing apparatus 204 determines the function address I' of the first graphics API on the client 20 based on the identifier 0009 of the first graphics API in the calling information of the first graphics API, and executes drawing code at the function address I'. The drawing code controls the GPU 211 to perform graphics drawing, so as to complete calling of the first graphics API in the second graphics library 203.

Optionally, in this step, when the parameter related to the first graphics API in the calling information of the first graphics API includes the output parameter generated when the first graphics API is called by the server 10, the second graphics processing apparatus 204 obtains an output parameter generated when the first graphics API is called by the client 20, and establishes a mapping relationship between the output parameter generated when the first graphics API is called by the server and the output parameter generated when the first graphics API is called by the client.

Because the client 20 and the server 10 have different hardware configurations, the output parameter generated when the first graphics API is called by the server 10 is also different from the output parameter generated when the first graphics API is called by the client 20. For example, if the first graphics API is used to apply for a segment of buffer space, an output parameter returned by the first graphics API is a memory address of the buffer space. Because the server 10 and the client 20 have completely different running environments, an output parameter (namely, a memory address) generated by the first graphics API on the server 10 is also different from an output parameter (namely, a memory address) generated by the first graphics API on the client 20.

Therefore, when the output parameter generated by the first graphics API is the input parameter of the another graphics API, the client 20 cannot directly use, as the input parameter of the another graphics API, the output parameter that is carried in the calling information of the first graphics API and that is generated when the first graphics API is called by the server 10. Correspondingly, the client 20 establishes the mapping relationship between the output parameter generated when the first graphics API is called by the server 10 and the output parameter generated when the first graphics API is called by the client 20, and the client 20 may query the mapping relationship based on the output parameter that is generated when the first graphics API is called by the server 10 and that is received from the server 10, to obtain the output parameter generated when the first graphics API is called by the client 20, and to use, as the input parameter of the another graphics API, the obtained output parameter generated when the first graphics API is called by the client 20. This overcomes a technical problem that output parameters are different due to the different hardware configurations of the client 20 and the server 10.

It should be noted that, in this embodiment of the present invention, the first graphics processing apparatus 105 actually copies the parameter related to the first graphics API. Specifically, when the first graphics API has the output parameter, the first graphics processing apparatus 105 copies the input parameter and the output parameter of the first graphics API. When the first graphics API has no output parameter, the first graphics processing apparatus 105 copies only the input parameter of the first graphics API. The first graphics processing apparatus 105 generates the calling information of the first graphics API based on the copied parameter and the identifier of the first graphics API.

Step S6: The application program 104 initiates a second drawing instruction based on the first processing notification, and the first graphics processing apparatus 105 obtains the second drawing instruction, where the second drawing instruction corresponds to a second graphics API, the second drawing instruction carries an input parameter of the second graphics API and a jump instruction that is used to jump to a function address of the second graphics API.

The second drawing instruction corresponds to a second graphics API in the first graphics library 103 and/or a second graphics API in the second graphics library 203.

Optionally, when the application program 104 initiates the second drawing instruction, and executes the second drawing instruction to jump to the function address to which the jump instruction in the second drawing instruction is intended to jump, the first graphics processing apparatus 105 may intercept the second drawing instruction by using a hook.

It should be understood that, it only needs to be ensured that step S6 is performed after step S3. Therefore, step S6 may also be immediately after step S3 or step S4.

In this step, after receiving the first processing notification sent by the first graphics processing apparatus 105, the application program 104 stops waiting, continues running, and initiates the second drawing instruction when running program instruction for which the second graphics API in the first graphics library 103 needs to be called. Therefore, the application program 104 is completely independent of the client 20, and can run independently on the server 10.

Step S7: The first graphics processing apparatus 105 calls the second graphics API in the first graphics library 103 according to the second drawing instruction to execute the second drawing instruction.

The first graphics processing apparatus 105 jumps to the function address of the second graphics API according to the jump instruction carried in the second drawing instruction, and executes drawing code at the function address of the first graphics API based on the input parameter of the second graphics API that is carried in the second drawing instruction. The drawing code controls the GPU 111 to perform graphics computation, so as to complete calling of the second graphics API in the second graphics library and execution of the second drawing instruction.

Step S8: The first graphics processing apparatus 105 generates a second processing notification after the second drawing instruction has been executed, and sends the second processing notification to the application program 104, where the second processing notification is used as an execution result of the second drawing instruction and is used to notify the application program 104 that the second graphics API has been called.

Step S9: The first graphics processing apparatus 105 generates calling information of the second graphics API, and sends the calling information of the second graphics API to the second graphics processing apparatus 204 on the client 20 by using the network 30.

The calling information of the second graphics API is used to instruct the client to call the second graphics API in the second graphics library, and the calling information of the second graphics API includes a parameter related to the second graphics API and an identifier of the second graphics API.

Step S10: The second graphics processing apparatus 204 receives the calling information of the second graphics API, determines the second graphics API based on the identifier of the second graphics API in the calling information of the second graphics API, and calls the second graphics API in the second graphics library based on the parameter related to the second graphics API in the calling information of the second graphics API.

In this step, the second graphics processing apparatus 204 determines the function address J' of the second graphics API on the client 20 based on the identifier 000A of the second graphics API in the calling information of the second graphics API, and executes drawing code at the function address J', to complete calling of the second graphics API in the second graphics library 203.

Optionally, in this step, when the input parameter of the second graphics API is the output parameter of the first graphics API, the second graphics processing apparatus 204 queries, based on the input parameter of the second graphics API, the mapping relationship recorded in step S5, and obtains a parameter corresponding to the input parameter of the second graphics API in the mapping relationship. The parameter corresponding to the input parameter of the second graphics API in the mapping relationship is the output parameter generated when the first graphics API is called by the client 20.

Therefore, when the output parameter generated by the first graphics API is the input parameter of the second graphics API, the technical problem that output parameters are different due to the different hardware configurations of the client 20 and the server 10 can be overcome in the foregoing processing manner.

It should be noted that, in some examples, the first graphics processing apparatus 105 may store the calling information of the first graphics API and the calling information of the second graphics API in a first in first out queue, and after a predetermined condition is met, simultaneously send data in the first in first out queue to the second graphics processing apparatus 204 on the client 20. The predetermined condition may be, for example, that a timing exceeds a preset time period, or that a size of the data in the first in first out queue exceeds a predetermined data size.

Because the application program 104 has a comparatively high running speed, a plurality of groups of calling information are generated per unit of time when the application program 104 runs. In comparison with sending a group of calling information to the client 20 each time the calling information is generated, simultaneously sending the plurality of groups of calling information to the client 20 in a package after the predetermined condition is met can effectively reduce processing overheads.

In conclusion, after a graphics API corresponding to a drawing instruction initiated by the application program 104 on the server 10 has been called, the application program 104 may immediately locally obtain a processing notification used to notify the application program 104 that the graphics API has been called. Therefore, the application program 104 on the server 10 can run independently without relying on the client 20, so that even if the client 20 breaks down or the client 20 is disconnected from the server 10, running of the application program 104 on the server 10 cannot be affected, and user experience can be improved.

Further, the first graphics processing apparatus 105 of the server 10 generates calling information carrying a parameter related to the graphics API, and sends the calling information to the client 20, and the client 20 may call the graphics API in the second graphics library based on the parameter related to the graphics API. However, before the first graphics processing apparatus 105 sends the calling information, the application program 104 of the server 10 has received the processing notification sent by the first graphics processing apparatus 105. Therefore, after calling the graphics API in the second graphics library 203, the client 20 does not need to send the processing notification to the application program 104 of the server 10. Therefore, unidirectional transmission is implemented between the server 10 and the client 20, and a requirement for a network latency can be reduced.

Figure 4A:
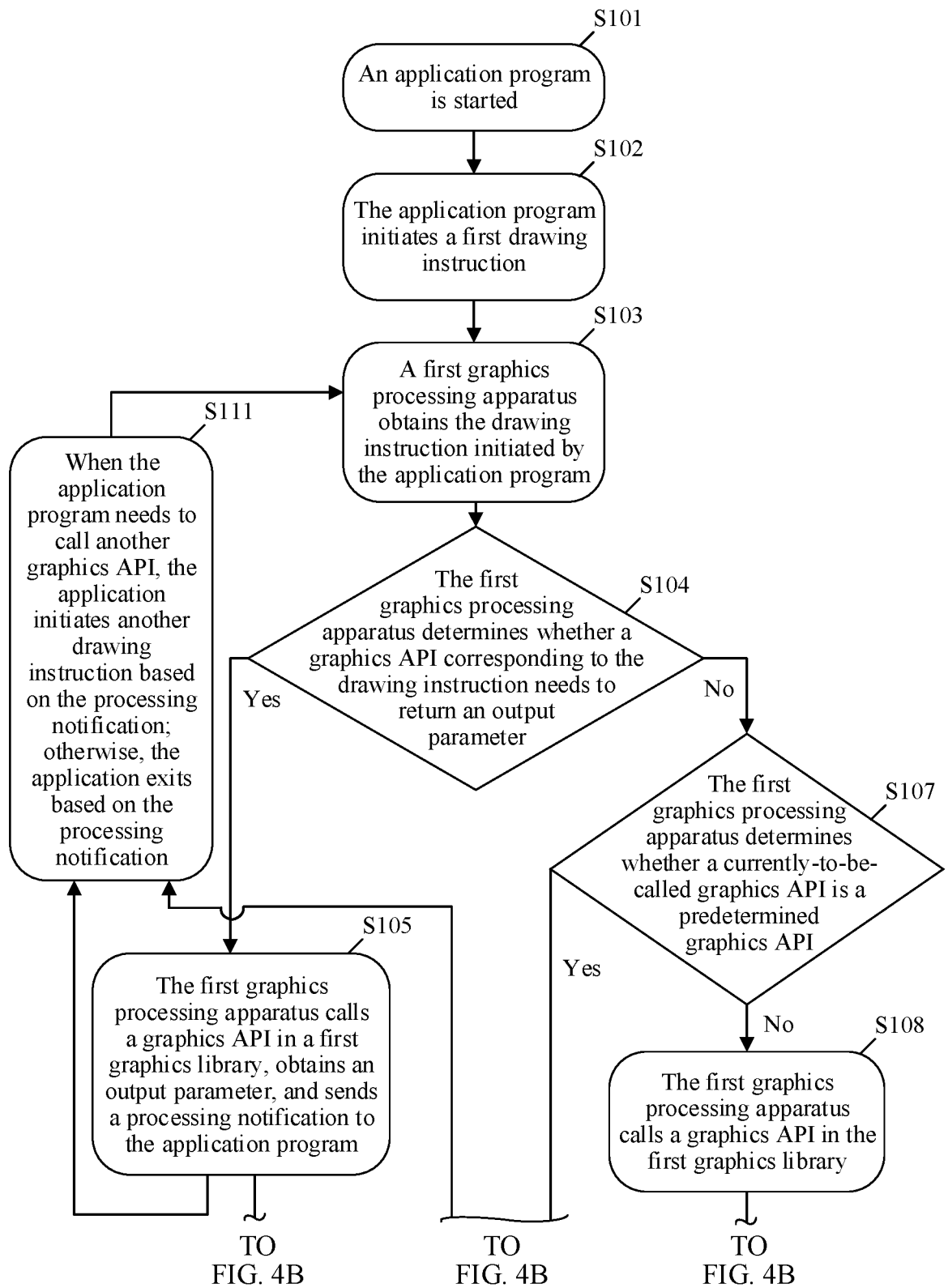
FIG. 4A and FIG. 4B are a flowchart of a graphics processing method according to an embodiment of the present invention.
Figure 4B:
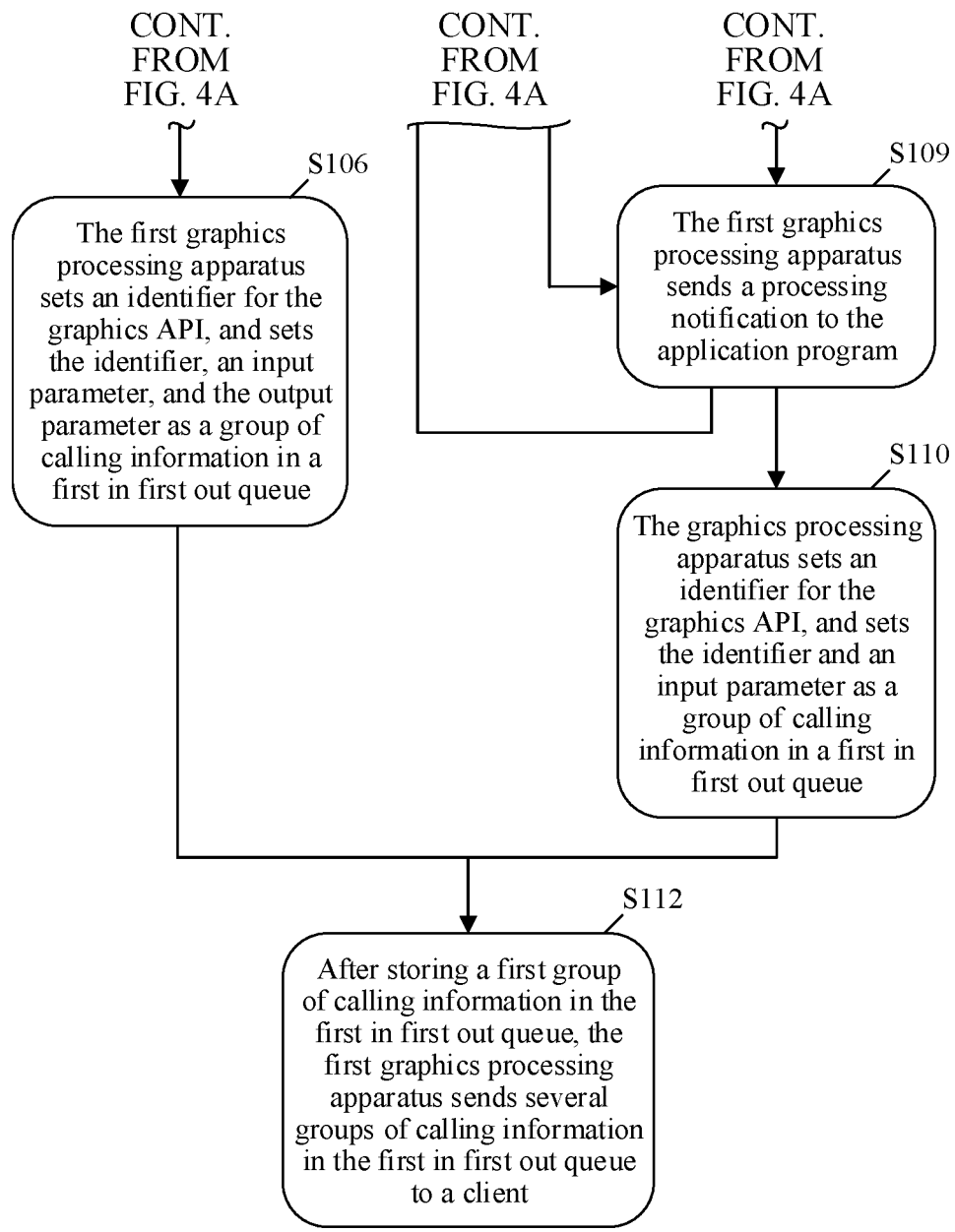

To further clearly describe the foregoing steps, refer to FIG. 4A and FIG. 4B. FIG. 4A and FIG. 4B are a flowchart of a graphics processing method according to an embodiment of the present invention. FIG. 4A and FIG. 4B specifically describe a working process of a server. As shown in FIG. 4A and FIG. 4B, the graphics processing method specifically includes the following steps.

Step S101: The application program 104 is started.

Step S102: The application program 104 initiates a first drawing instruction. Specifically, when running program instruction for which a first graphics API needs to be called, the application program 104 initiates the first drawing instruction.

The first drawing instruction carries an input parameter of the first graphics API and a jump instruction that is used to jump to a function address of the first graphics API, and the function address is a function address I of the first graphics API on the server 10 and the input parameter of the first graphics API.

Step S103: The first graphics processing apparatus 105 obtains the first drawing instruction.

In some examples, the first graphics processing apparatus 105 intercepts the first drawing instruction by using a hook.

Step S104: The first graphics processing apparatus 105 determines whether a graphics API corresponding to the graphics processing request needs to return an output parameter; and if yes, performs step S105; or if no, performs step S107.

In this step, the first graphics processing apparatus 105 may pre-record which one of all graphics APIs in the first graphics library 103 needs to return an output parameter, and which one does not need to return an output parameter.

For example, when the first graphics library 103 is an Opengl graphics library, the first graphics processing apparatus 105 may pre-record whether each graphics API in the Opengl graphics library needs to return an output parameter. Moreover, a type (such as an integer, a pointer, a memory address, and a register address), a quantity, and an arrangement sequence of an input parameter of a graphics API and whether the graphics API needs to return an output parameter are defined in a technical document disclosed in the Opengl graphics library. A programmer may write, by reading the technical document, corresponding program instruction to call the graphics API.

Step S105: The first graphics processing apparatus 105 calls a graphics API in the first graphics library 103, obtains an output parameter, and sends, to the application program 104, a processing notification carrying the output parameter, where the processing notification is used to notify the application program 104 that the current graphics API has been called.

Step S106: The first graphics processing apparatus 105 sets an identifier for the graphics API, and sets the identifier, an input parameter, and the output parameter as a group of calling information in a first in first out queue.

For example, the first graphics processing apparatus 105 may set the identifier for the graphics API according to Table 1 described above. Specifically, the first graphics processing apparatus 105 obtains a jump instruction carried in a current drawing instruction, searches Table 1 for an identifier corresponding to a function address to which the jump instruction is intended to jump, and uses the found identifier as the identifier corresponding to the current graphics API.

Step S107: The first graphics processing apparatus 105 determines whether the currently-to-be-called graphics API is a predetermined graphics API; and if yes, performs step 109 to refuse to call a graphics API in the first graphics library 103; or if no, performs step S108 to call a graphics API in the first graphics library 103. The predetermined graphics API includes any one of a shader-starting graphics API, a rasterization-starting graphics API, a buffer-clearing graphics API, and a buffer-swapping graphics API.

It should be noted that, when drawing code corresponding to the shader-starting graphics API, the rasterization-starting graphics API, the buffer-clearing graphics API, and the buffer-swapping graphics API is executed, the GPU 111 needs to perform a large amount of computation. In this step, when determining that the currently-to-be-called graphics API is the predetermined graphics API, the first graphics processing apparatus 105 directly skips step S108, and refuses to call the predetermined graphics API, so that the GPU 111 can be prevented from performing a large amount of graphics computation, thereby implementing empty rendering and saving precious computing resources on the server 10.

Because the server 10 does not need to display a drawn graphic to a user, user experience is not affected even if the GPU 111 does not work.

Step S108: The first graphics processing apparatus 105 calls the graphics API in the first graphics library 103.

In this step, the first graphics processing apparatus 105 jumps to a function address of a jump instruction according to the jump instruction carried in the currently obtained drawing instruction, and executes drawing code at the function address by using an input parameter carried in the current graphics processing request as an input parameter.

Step S109: After calling the graphics API in the first graphics library 103, the first graphics processing apparatus 105 sends a processing notification to the application program 104, where the processing notification is used to notify the application program 104 that the graphics API has been called. After this step is performed, the process goes to step S111 and step S110.

It should be noted that, in comparison with step S105, in this step, because the graphics API does not need to return an output parameter, the processing notification sent in this step does not carry the output parameter of the graphics API.

Step S110: The first graphics processing apparatus 105 sets an identifier for the graphics API, and sets the identifier and the input parameter as a group of calling information in a first in first out queue.

Similar to step S105, in this step, the first graphics processing apparatus 105 may set the identifier for the graphics API according to Table 1 described above. Specifically, the first graphics processing apparatus 105 may search Table 1 for an identifier corresponding to the function address to which the jump instruction is intended to jump, and use the found identifier as the identifier corresponding to the current graphics API.

Step S111: The application program 104 continues running the program instruction based on the received processing notification, and initiates another drawing instruction when running program instruction for which another graphics API needs to be called. Then, the process goes back to step S103.

Therefore, as the application program 104 sequentially initiates a plurality of drawing instructions according to running of program instruction, the first graphics processing apparatus 105 may sequentially locally call a plurality of graphics APIs for the different drawing instructions, and store calling information of the called graphics APIs in the first in first out queue. The calling information of the called graphics APIs specifically describes parameters related to the plurality of graphics APIs that are called by the server 10, and types of the graphics APIs.

Step S112: After storing a first group of calling information in the first in first out queue, the first graphics processing apparatus 105 sends several groups of calling information in the first in first out queue to the client 20 every predetermined time.

In this step, the predetermined time may be, for example, 3 ms. By setting the predetermined time, the recorded several groups of calling information may be automatically sent to the client 20 every predetermined time.

Because the application program 104 has a comparatively high running speed, when the application program 104 runs, a plurality of groups of calling information are generated per unit of time. If one group of calling information is sent to the client 20 each time the group of calling information is generated, the calling information needs to be sent for a plurality of times per unit of time. In comparison with sending one group of calling information to the client 20 each time the group of calling information is generated, simultaneously sending the plurality of groups of calling information in a package after the predetermined time can effectively reduce processing overheads.

Further, after the first graphics processing apparatus 105 sends N groups of calling information to the client 20, if the application program 104 continues calling a graphics API, the first graphics processing apparatus 105 further sends L groups of calling information to the client 20 after the predetermined time. Values of L and N may be the same or different, and a quantity of pieces of calling information depends on a quantity of graphics APIs that are called by the first graphics processing apparatus 105 within the predetermined time. For example, within first 3 ms, 50 graphics APIs may be processed in the process shown in FIG. 4A and FIG. 4B, that is, the first 3 ms corresponds to 50 groups of calling information. Within second 3 ms, 70 graphics APIs may be processed in the process shown in FIG. 4A and FIG. 4B, that is, the second 3 ms corresponds to 70 groups of calling information.

Therefore, in the process shown in FIG. 4A and FIG. 4B, the first graphics processing apparatus 105 may continuously record, in the first in first out queue with running of the application program 104, identifiers of graphics APIs that are called by the application program 104 in the running process and related parameters, and periodically send the plurality of groups of calling information recorded in the first in first out queue to the client 20. Because the first graphics processing apparatus 105 sends a processing notification to the application program 104 in a timely manner before recording the calling information each time, the application program 104 may continue running after obtaining the processing notification. Therefore, in this embodiment of the present invention, the client 20 does not affect running of the application program 104 at all.

Even if the client 20 breaks down, a consequence is only that the calling information sent by the server 10 to the client 20 cannot be received by the client 20; and the application program 104 on the server 10 is not affected, and the application program 104 can still run properly. Therefore, user experience can be greatly improved.

To further explain the process shown in FIG. 4A and FIG. 4B, the cyclic process shown in FIG. 4A and FIG. 4B may be described herein by using the first graphics API and the second graphics API shown in Table 1 as an example. It is assumed that input parameters of the first graphics API are x, y, and z, there is a dependency relationship between the first graphics API and the second graphics API, an output parameter generated when the first graphics API is called by the server 10 based on the input parameters x, y, and z is retA, an output parameter generated when the second graphics API is called by the server 10 based on the input parameter retA is retB, an output parameter generated when the first graphics API is called by the client 20 based on the input parameters x, y, and z is retA', and an output parameter generated when the second graphics API is called by the client 20 based on the input parameter retA' is retB'.

In addition, it is assumed that program instruction of the application program 104 is set to only serially call the first graphics API and the second graphics API each time.

Figure 5:
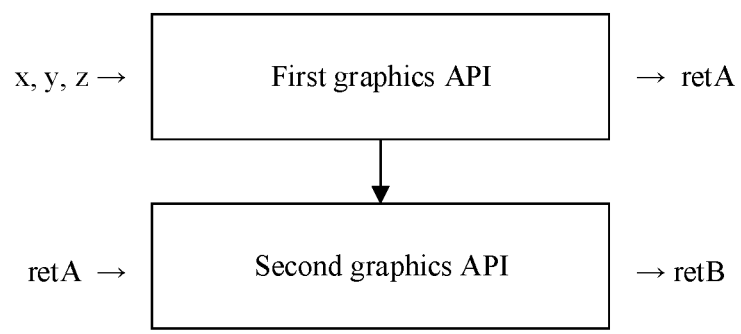
FIG. 5 is another schematic diagram of calling a graphics API by an application program according to an embodiment of the present invention.
Figure 6:
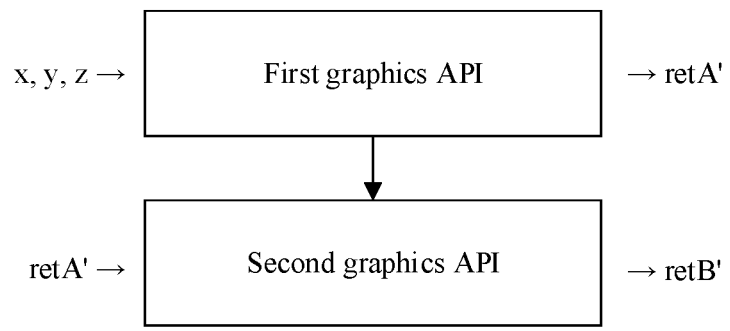
FIG. 6 is a schematic diagram of calling a graphics API by a second graphics processing apparatus according to an embodiment of the present invention.

This may be understood with reference to FIG. 5 and FIG. 6. FIG. 5 is another schematic diagram of calling a graphics API by an application program according to an embodiment of the present invention. As shown in FIG. 5, program instruction of the application program 104 is set to separately call a first graphics API and a second graphics API, input parameters x, y, and z are constants specified in the program instruction, and an input parameter of the second graphics API is an output parameter retA of the first graphics API.

FIG. 6 is a schematic diagram of calling a graphics API by a second graphics processing apparatus according to an embodiment of the present invention. As shown in FIG. 6, the second graphics processing apparatus 204 separately calls a first graphics API and a second graphics API, input parameters x, y, and z of the first graphics API are obtained from a first group of calling information, an input parameter retA' of the second graphics API is obtained from a mapping table. Details are described below.

It should be noted that, in this embodiment of the present invention, even if entered input parameters are the same, the output parameters generated after the same graphics API is called by the server 10 and the client 20 are different. For example, the output parameter retA generated when the first graphics API is called by the server 10 based on the input parameters x, y, and z is different from the output parameter retA' generated when the first graphics API is called by the client 20 based on the input parameters x, y, and z.

A reason is that the server 10 and the client 20 have different running environments. For example, if a graphics API is used to apply for a segment of buffer space, an output parameter returned by the graphics API is a memory address of the buffer space. Because the server 10 and the client 20 have completely different running environments, an output parameter (namely, a memory address) generated by the graphics API on the server 10 is also different from an output parameter (namely, a memory address) generated by the graphics API on the client 20.

Figure 7:
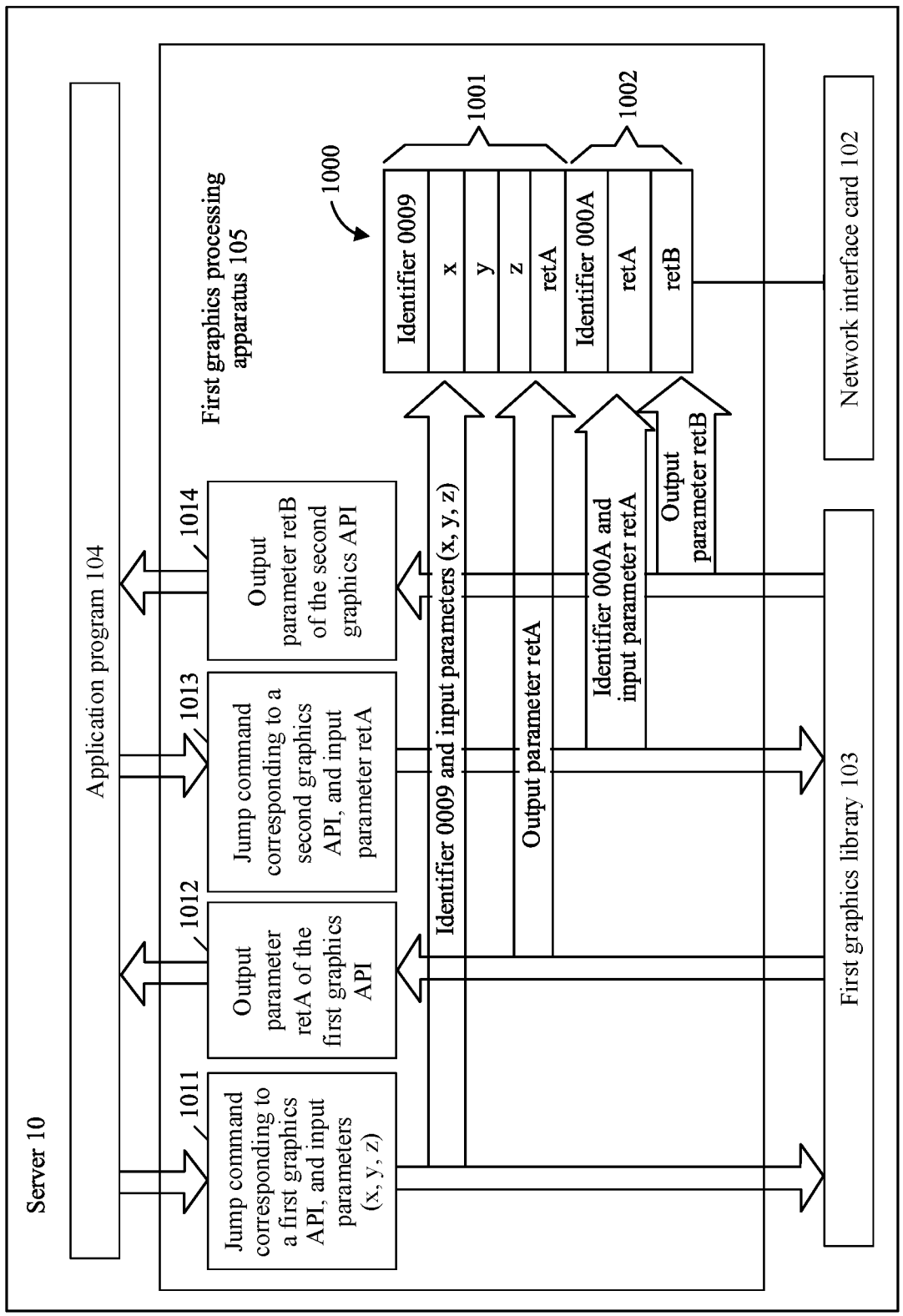
FIG. 7 is a data flow diagram of a server according to an embodiment of the present invention.

In the following, still refer to FIG. 3A and FIG. 3B with reference to examples provided in FIG. 5 to FIG. 7. FIG. 7 is a data flow diagram of a server according to an embodiment of the present invention.

Step S101: The application program 104 is started.

Step S102: When running program instruction for which a first graphics API needs to be called, the application program 104 initiates a first drawing instruction 1011 (as shown in FIG. 7), where the first drawing instruction 1011 includes input parameters x, y, and z of the first graphics API and a jump instruction that is used to jump to a function address I of the first graphics API.

Step S103: The first graphics processing apparatus 105 obtains the first graphics processing request 1011, to obtain the jump instruction that jumps to the function address I of the first graphics API on the server 10, and the input parameters x, y, and z.

Step S104: The first graphics processing apparatus 105 determines whether the first graphics API needs to return an output parameter.

It can be learned from FIG. 5 that, the first graphics processing apparatus 105 may determine that the first graphics API needs to return an output parameter. Therefore, the process goes to step S105.

Step S105: The first graphics processing apparatus 105 calls a first graphics API in the first graphics library 103. Specifically, the first graphics processing apparatus 105 jumps to the function address I of the first graphics API on the server 10, runs drawing code at the function address I by using the input parameters x, y, and z as input parameters, obtains an output parameter retA as a running result after the drawing code has been run, and sends, to the application program 104, a first processing notification 1012 (as shown in FIG. 7) including the output parameter retA. Then, the process goes to step S111 and step S106.

The first processing notification 1012 is used to notify the application program 104 that the current first graphics API has been called.

Step S106: The first graphics processing apparatus 105 sets a first identifier 0009 for the first graphics API according to Table 1, and sets the first identifier 0009, the input parameters x, y, and z, and the output parameter retA as calling information 1001 of the first graphics API in a first in first out queue 1000.

Step S112: The first graphics processing apparatus 105 starts timing after storing the calling information 1001 of the first graphics API in the first in first out queue 1000.

In some examples, two bytes are used as a basic unit in the first in first out queue 1000, and the first graphics processing apparatus 105 separately stores the identifier 0009, the input parameters x, y, and z, and the output parameter retA in eight bytes in the first in first out queue 1000. Therefore, the calling information 1001 of the first graphics API includes the eight bytes.

Step S111: The application program 104 continues running the program instruction based on the first processing notification 1012, and initiates a second graphics instruction 1013 when running program instruction for which a second graphics API needs to be called.

Specifically, in this step, after receiving the first processing notification 1012, the application program 104 continues running, and initiates the second drawing instruction 1013 when running the program instruction for which the second graphics API needs to be called. The second drawing instruction includes a jump instruction that jumps to a function address J of the second graphics API on the server 10, and the input parameter retA carried in the first processing notification 1012.

In this case, the process goes back to step S103.

Step S103: The first graphics processing apparatus 105 obtains the second drawing instruction 1013, to obtain the jump instruction that jumps to the function address J of the second graphics API on the server 10, and the input parameter retA.

Step S104: The first graphics processing apparatus 105 determines whether the second graphics API needs to return an output parameter.

It can be learned from FIG. 5 that, the second graphics API needs to return an output parameter. Therefore, in this step, the first graphics processing apparatus 105 determines that the second graphics API needs to return the output parameter, and the process goes to step S105.

Step S105: The first graphics processing apparatus 105 calls the second graphics API in the first graphics library 103. Specifically, the first graphics processing apparatus 105 jumps to the function address J of the second graphics API on the server 10 according to the jump instruction, runs drawing code at the function address J by using the input parameter retA as an input parameter, obtains an output parameter retB as a running result after the drawing code has been run, returns retB to the application program 104, and sends, to the application program 104, a second processing notification 1014 including the output parameter retB of the second graphics API. Then, the process goes to step S111 and step S106.

The second processing notification 1014 is used to notify the application program 104 that the current second graphics API has been called.

Step S111: As shown in FIG. 5, in this embodiment, the program instruction is used to separately call the first graphics API and the second graphics API each time. Therefore, after the application program 104 has called the foregoing two graphics APIs, there is no another graphics API, and the application program 104 does not need to continue calling a new graphics API. In this case, another drawing instruction is not initiated, the application program 104 exits running based on the second processing notification 1012, and the loop stops.

Step S106: The first graphics processing apparatus 105 sets an identifier 000A for the second graphics API according to Table 1, and sets the identifier 000A, the input parameter retA, and the output parameter retB as calling information 1002 of the second graphics API in the first in first out queue 1000.

Step S112: The first graphics processing apparatus 105 sends two groups of calling information in the first in first out queue 1000 to the client 20 by using the network interface card 112 after a predetermined time arrives.

It should be noted that, in this embodiment, the predetermined time may be set to be long enough, so that the application program 104 can complete calling of both the first graphics API and the second graphics API. The predetermined time may be, for example, 3 ms.

In conclusion, the first in first out queue 1000 includes the calling information 1001 and the calling information 1002; the calling information 1001 includes the first identifier 0009, the input parameters x, y, and z, and the output parameter retA; and the calling information 1002 includes the second identifier 000A, the input parameter retA, and the output parameter retB.

In some examples, two bytes are used as a basic unit in the first in first out queue 1000, the first graphics processing apparatus 105 separately stores the first identifier 0009, the input parameters x, y, and z, and the output parameter retA in the first eight bytes in the first in first out queue 1000, that is, the calling information 1001 includes the eight bytes; and the first graphics processing apparatus 105 separately stores the second identifier 000A, the input parameter retA, and the output parameter retB in the following six bytes in the first in first out queue 1000, that is, the calling information 1002 includes the six bytes. Therefore, a total data length of the two groups of calling information is 14 bytes.

It can be learned from the foregoing disclosed content that, the application program 104 on the server 10 runs locally on the server 10, the server 10 unidirectionally sends N groups of data to the client 20, and the server 10 does not need to receive data from the client 20. Therefore, a waiting time for receiving the data from the client 20 can be saved, and a running speed of the application program 104 can be greatly increased.

Figure 8A:
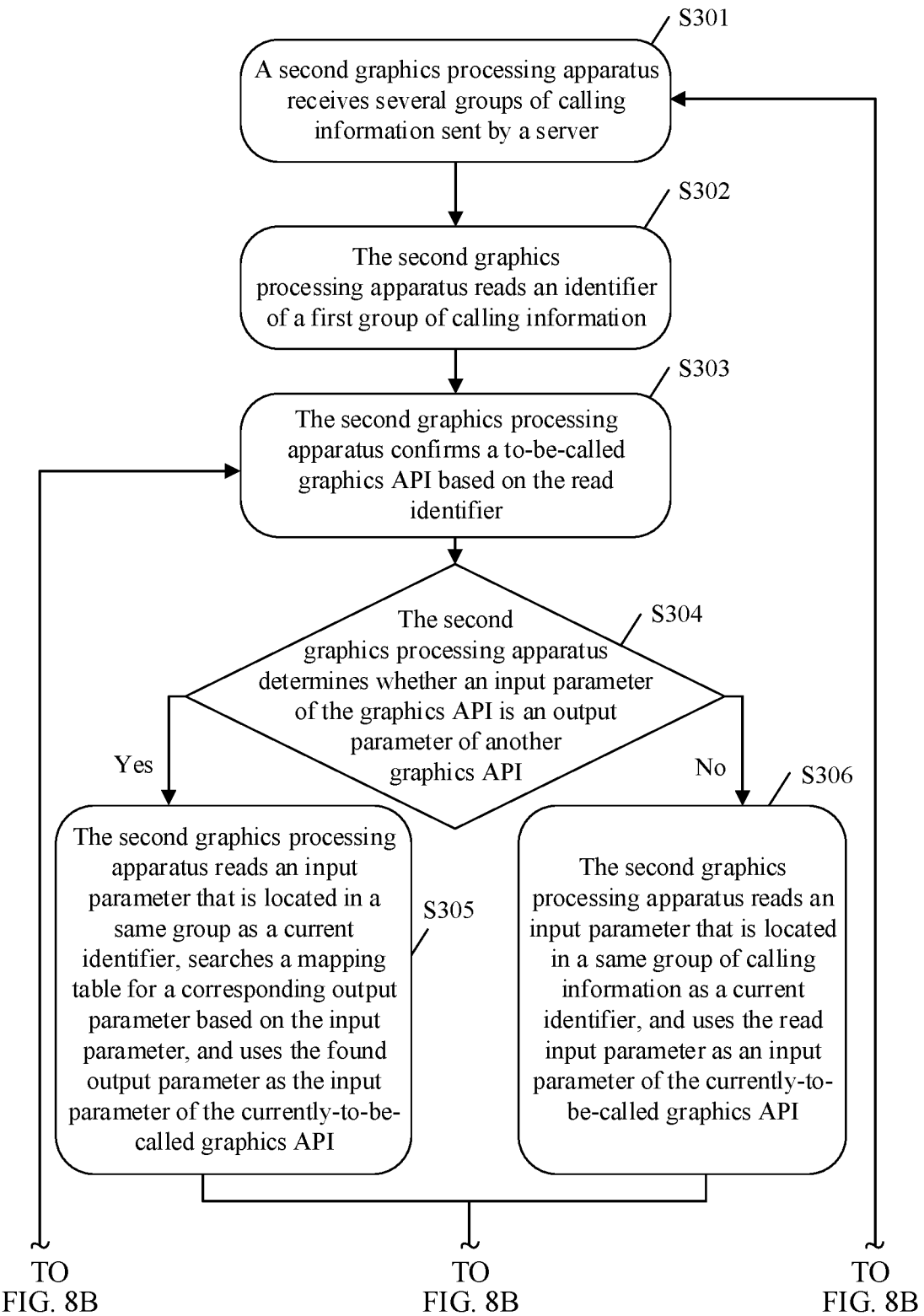
FIG. 8A and FIG. 8B are another flowchart of a graphics processing method according to an embodiment of the present invention.
Figure 8B:
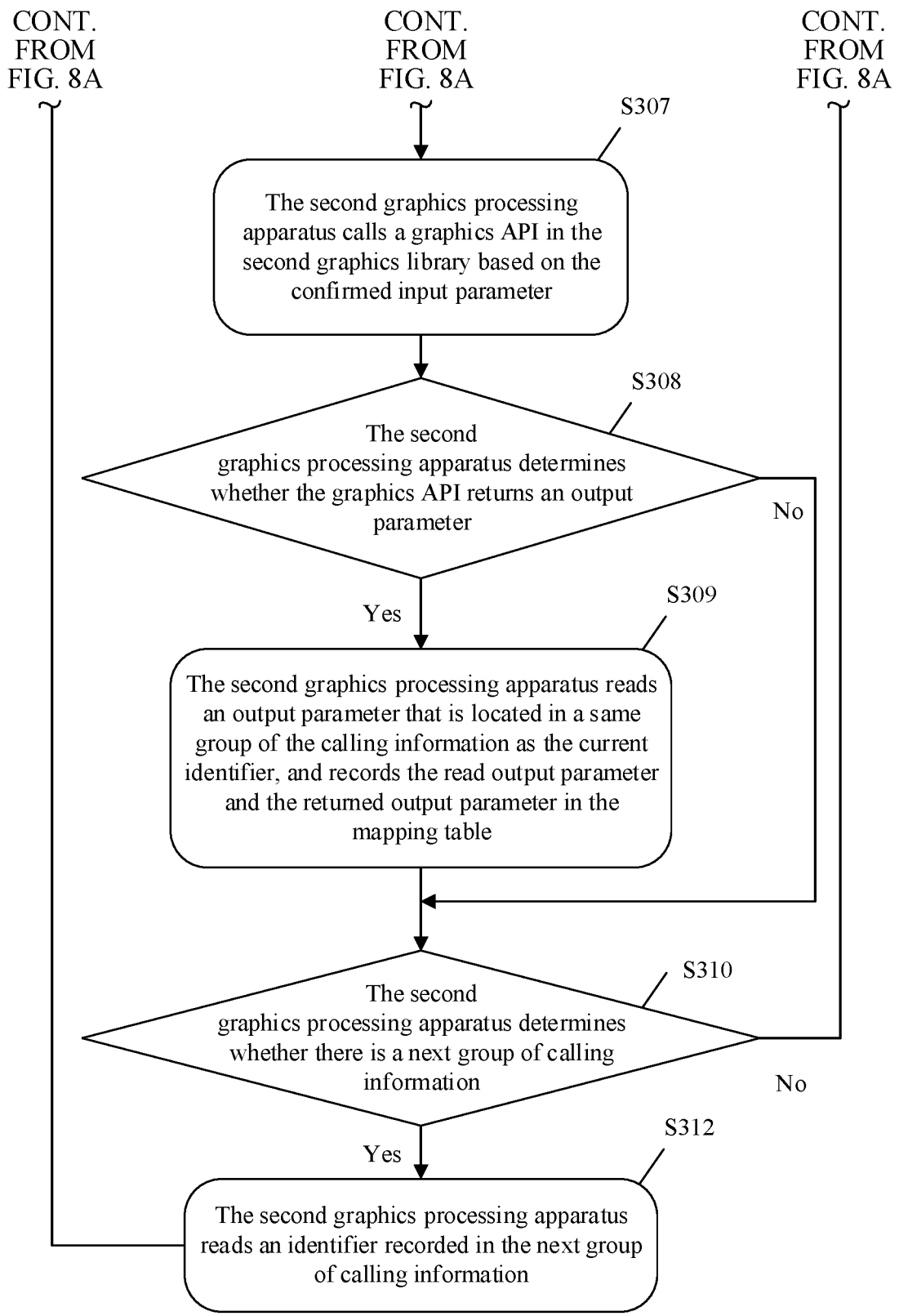

FIG. 8A and FIG. 8B are another flowchart of a graphics processing method according to an embodiment of the present invention. FIG. 8A and FIG. 8B describe a working process of the client 20. As shown in FIG. 8A and FIG. 8B, the graphics processing method specifically includes the following steps.

Step S301: The second graphics processing apparatus 204 receives severals groups of calling information sent by the server 10.

Specifically, the second graphics processing apparatus 204 receives, by using the network interface card 212, the several groups of calling information sent by the first graphics processing apparatus 105 on the server 10.

Step S302: The second graphics processing apparatus 204 reads an identifier of a first group of calling information.

Optionally, the first group of calling information is located in a start position of the several groups of calling information, and the identifier is located in a start position of the first group of calling information.

Step S303: The second graphics processing apparatus 204 determines, based on the read identifier, a to-be-called graphics API.

Specifically, the second graphics processing apparatus 204 searches Table 2 based on the read identifier, to confirm a function address of the to-be-called graphics API on the client 20, thereby confirming the to-be-called graphics API.

Step S304: The second graphics processing apparatus determines whether an input parameter of the graphics API is an output parameter of another graphics API; and if yes, performs step S305; or if no, performs step S306.

In this step, graphics APIs are classified into two types: graphics APIs that may return an output parameter and graphics APIs that return no output parameter. In this embodiment of the present invention, the input parameter of the to-be-called graphics API is determined based on a determined type of the graphics API and an input parameter that is located in the same group of calling information as the identifier.

In the following step S305 and step S306, corresponding processing is performed on the two types of graphics APIs.

Step S305: The second graphics processing apparatus 204 reads the input parameter that is located in the same group of calling information 1002 as the current identifier, searches a mapping table for a corresponding output parameter based on the input parameter, and uses the found output parameter as the input parameter of the currently-to-be-called graphics API.

A mapping relationship between an output parameter generated when a specific graphics API is called by the server and an output parameter generated when the specific graphics API is called by the client is recorded in the mapping table, and the mapping table is generated based on step S309 described below.

Step S306: The second graphics processing apparatus 204 reads the input parameter that is located in the same group of calling information 1001 as the current identifier, and uses the read input parameter as the input parameter of the currently-to-be-called graphics API.

It should be noted that, for a graphics API having a plurality of input parameters, if some of the plurality of input parameters are not output parameters of other graphics APIs, and some other of the plurality of input parameters are output parameters of the other graphics APIs, the input parameters that are the output parameters of the other graphics APIs may be obtained by performing step S305, and the input parameters that are not the output parameters of the other graphics APIs may be obtained by performing step S306.

Step S307: The second graphics processing apparatus 204 calls a graphics API in the second graphics library 203 based on the confirmed input parameter.

Step S308: The second graphics processing apparatus 204 determines whether the graphics API returns an output parameter; and if yes, performs step S309; or if no, performs step S310.

Step S309: The second graphics processing apparatus 204 reads an output parameter that is located in the same group of calling information 1002 as the current identifier, and records the read output parameter and the returned output parameter in the mapping table.

Step S310: The second graphics processing apparatus 204 determines whether there is a next group of calling information; and if yes, performs step S312; or if no, performs step S301. In step 301, the second graphics processing apparatus 204 continues receiving other several groups of calling information sent by the server 10, and continues to perform step 301 to step 312 for the other several groups of calling information.

Step S312: The second graphics processing apparatus 204 reads an identifier recorded in the next group of calling information, and goes to step S303, to continue to perform step 303 to step 312 for the next group of calling information.

In conclusion, the client 20 may sequentially locally call, based on the received several groups of calling information, several graphics APIs that have been called by the server 10, to locally perform graphics drawing, so that a user of the client 20 can locally view, on the client 20, an interface drawn when the application program 104 on the server 10 runs. In addition, the client 20 does not need to send data to the server 10, and therefore unidirectional transmission is implemented.

To further explain the process shown in FIG. 8A and FIG. 8B, the first graphics API and the second graphics API listed in Table 1 and Table 2 may be used as an example for description herein. In addition, the several groups of calling information are specifically the two groups of calling information in FIG. 7 and the corresponding descriptions of FIG. 7, and the two groups of calling information include the first group of calling information 1001 and the second group of calling information 1002.

Figure 9:
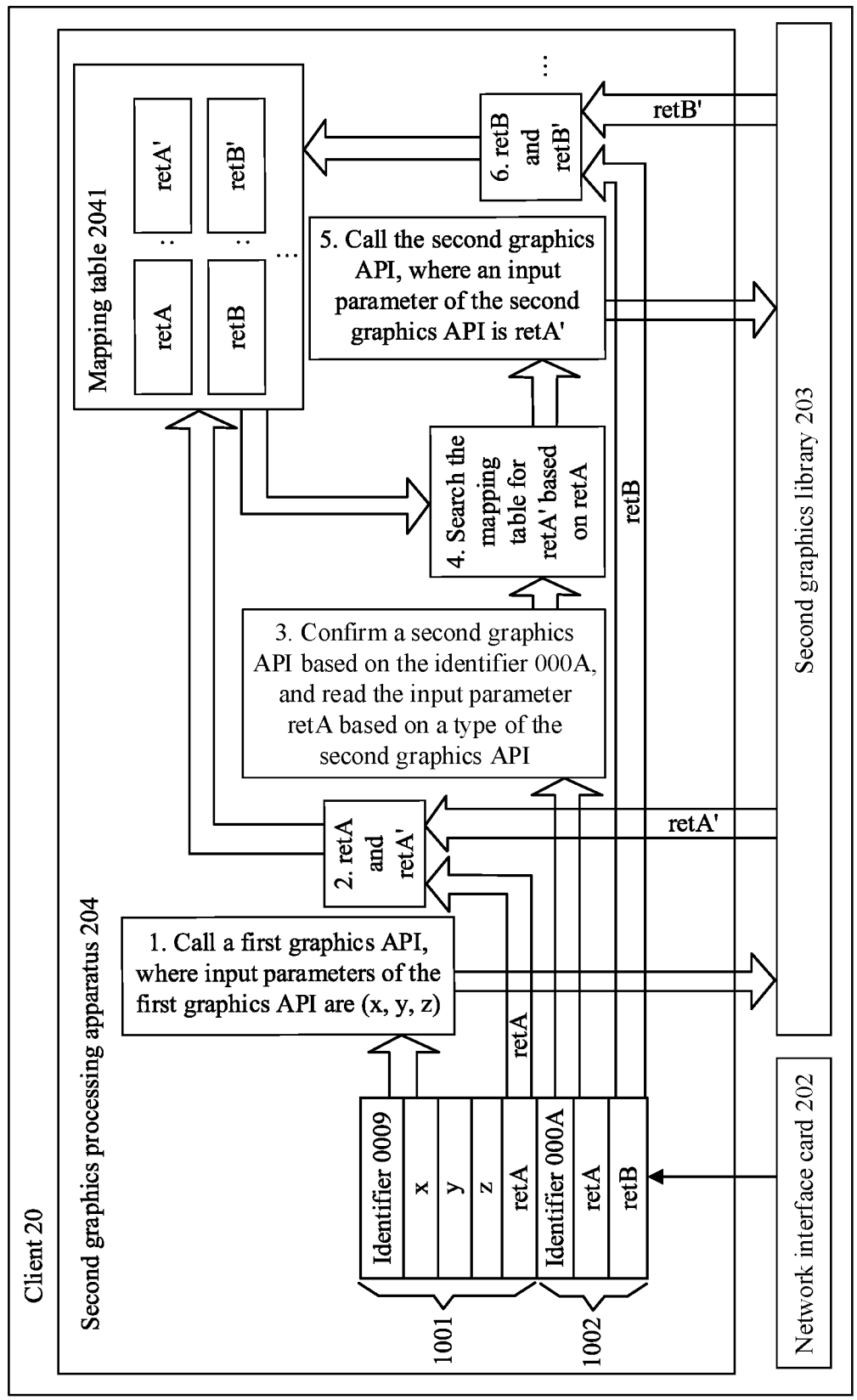
FIG. 9 is a data flow diagram of a client according to an embodiment of the present invention.

In addition, still refer to the process shown in FIG. 8A and FIG. 8B with reference to FIG. 9. FIG. 9 is a data flow diagram of a client according to an embodiment of the present invention.

Step S301: The second graphics processing apparatus 204 receives two groups of calling information sent by the server 10, where the two groups of calling information include the first group of calling information 1001 and the second group of calling information 1002, the first group of calling information 1001 is located in a header of the two groups of calling information, and the identifier 0009 is located in a header of the first group of calling information 1001.

Step S302: The second graphics processing apparatus 204 reads the identifier 0009 in the first group of calling information 1001 of the two groups of calling information.

Step S303: The second graphics processing apparatus 204 searches Table 2 based on the read identifier 0009 to obtain a function address I' of a to-be-called first graphics API on the client 20, so as to confirm the to-be-called first graphics API.

Step S304: The second graphics processing apparatus 204 determines whether an input parameter of the first graphics API is an output parameter of another graphics API, and performs step S306 if a determining result is no.

Step S306: The second graphics processing apparatus 204 reads input parameters x, y, and z that are located in the same group of calling information as the current identifier 0009, and uses the read input parameters x, y, and z as input parameters of the currently-to-be-called first graphics API.

Step S307: The second graphics processing apparatus 204 calls a first graphics API in the second graphics library 203 based on the confirmed input parameters x, y, and z.

Specifically, the second graphics processing apparatus 204 jumps to a function address I' of the first graphics API on the client 20, and runs drawing code at the function address I' by using the input parameters x, y, and z as input parameters.

The drawing code is used to control the GPU 211 to perform graphics drawing, and an output parameter retA' used as a running result is obtained after the drawing code has been run.

This may be understood with reference to FIG. 9. Specifically, this step corresponds to step 1 in FIG. 9.

Step S308: The second graphics processing apparatus 204 determines whether the first graphics API returns an output parameter, and performs step S309 if a determining result is yes.

Step S309: The second graphics processing apparatus 204 reads an output parameter retA that is located in the same group of calling information 1001 as the current identifier 0009, and records a mapping relationship between the read output parameter retA and the returned output parameter retA' in a mapping table 2041 (refer to FIG. 9).

Specifically, this step corresponds to step 2 in FIG. 9.

Step S310: The second graphics processing apparatus 204 determines whether there is a next group of calling information. Because there is further the second group of calling information 1002, a determining result is yes, and step S312 is performed.

Step S312: The second graphics processing apparatus 204 reads an identifier 000A recorded in the next group of calling information 1002, and goes to step S303, so that this process is performed repeatedly.

Step S303: The second graphics processing apparatus 204 searches Table 2 based on the read identifier 000A, to obtain a function address J' of a to-be-called second graphics API on the client 20, so as to confirm the to-be-called second graphics API.

This step corresponds to a step of obtaining an API2 based on the identifier in step 3 in FIG. 9.

Step S304: The second graphics processing apparatus 204 determines whether an input parameter of the second graphics API is an output parameter of another graphics API, and performs step S305 if a determining result is no.

In this step, an input parameter retA' generated when the second graphics

API is called by the client 20 is the output parameter retA' generated when the first graphics API is called by the client 20. Therefore, the second graphics processing apparatus 204 performs step 305.

Step S305: The second graphics processing apparatus 204 reads an input parameter retA that is located in the same group of calling information as the current identifier 000A, searches the mapping table 2041 for the corresponding output parameter retA' based on the input parameter retA, and uses the found output parameter retA' as the input parameter of the currently-to-be-called second graphics API.

This may be understood with reference to FIG. 9. Specifically, this step corresponds to a step of reading the input parameter retA in step 3, and step 4 in FIG. 9.

Step S307: The second graphics processing apparatus 204 calls a second graphics API in the second graphics library 203 based on the confirmed input parameter retA'.

This step corresponds to step 5 in FIG. 9.

Specifically, in the calling process, the second graphics processing apparatus 204 may jump to a function address J' of the second graphics API on the client 20, and executes drawing code at the function address J' by using the input parameter retA' as an input parameter. The drawing code is used to control the GPU 211 to perform graphics drawing, and an output parameter retB' used as a running result is obtained after the drawing code has been run.

Step S308: The second graphics processing apparatus 204 determines whether the second graphics API returns an output parameter, and performs step S309 if a determining result is yes.

Step S309: The second graphics processing apparatus 204 reads an output parameter that is located in the same group of calling information as the current identifier 000A, and records the read output parameter retB and the returned output parameter retB' in the mapping table 2041.

Step S310: The second graphics processing apparatus 204 determines whether there is a next group of calling information. Because it is assumed that several groups of calling information are specifically two groups of calling information, and there is no next group of calling information, a determining result is no, and step S301 is performed to continue receiving other several groups of calling information for similar processing.

Therefore, as shown in FIG. 6, the second graphics processing apparatus 204 may locally call two graphics APIs based on the received two groups of calling information, to complete graphics processing.

Optionally, in some examples, the first graphics processing apparatus 105 may separately write the generated plurality of groups of calling information into a file, and store the file. The client 20 may download the file from the server 10 after a specific time (for example, after a few days), and the second graphics processing apparatus 204 sequentially reads, based on the process shown in FIG. 8A and FIG. 8B, the plurality of groups of calling information that are recorded in the file, to play back a drawing interface of the application program 104.

Figure 10:
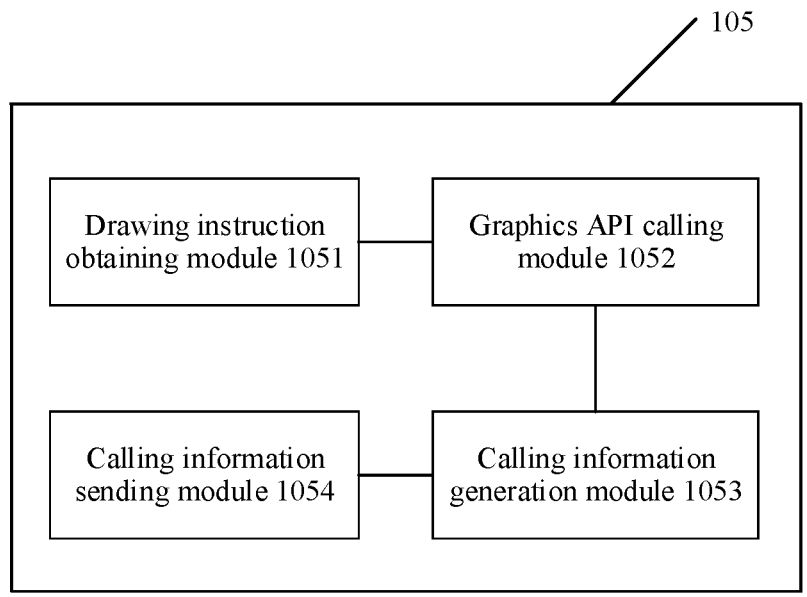
FIG. 10 is a schematic structural diagram of a graphics processing apparatus according to this embodiment of the present invention.

Referring to FIG. 10, an embodiment of the present invention provides a graphics processing apparatus. FIG. 10 is a schematic structural diagram of an apparatus of the graphics processing apparatus according to this embodiment of the present invention. The graphics processing apparatus is included in the server 10. As shown in FIG. 10, the graphics processing apparatus 105 includes:

a drawing instruction obtaining module 1051, configured to obtain a first drawing instruction initiated by the application program 104, where the first drawing instruction corresponds to a first graphics API;

a graphics API calling module 1052, configured to call a first graphics API in the first graphics library 203 according to the first drawing instruction to execute the first drawing instruction, and send a first processing notification to the application program 104, where the first processing notification is used to notify the application program 104 that the first graphics API has been called;

a calling information generation module 1053, configured to generate calling information of the first graphics API, where the calling information of the first graphics API is used to instruct the client 20 to call a first graphics API in the second graphics library 203, and the calling information of the first graphics API includes a parameter related to the first graphics API and an identifier of the first graphics API; and a calling information sending module 1054, configured to send the calling information of the first graphics API to the client 20.

Optionally, the calling information generation module 1053 is further configured to determine whether an input parameter needs to be returned for the first drawing instruction. When an input parameter needs to be returned for the first drawing instruction, the first processing notification further includes an output parameter generated when the first graphics API is called by the server 10, the calling information of the first graphics API includes an input parameter of the first graphics API, the output parameter generated when the first graphics API is called by the server 10, and the identifier of the first graphics API.

Optionally, when no output parameter needs to be returned by the first graphics API, the calling information of the first graphics API includes the input parameter of the first graphics API and the identifier of the first graphics API.

Optionally, the drawing instruction obtaining module 1051 is configured to obtain a second drawing instruction initiated by the application program 104 based on the first processing notification. The second drawing instruction corresponds to a second graphics API, and an input parameter of the second graphics API is the output parameter generated when the first graphics API is called by the server 10. The graphics API calling module 1052 is configured to call a second graphics API in the first graphics library 103 according to the second drawing instruction, and send a second processing notification to the application program 104. The second processing notification is used to notify the application program that the second graphics API has been called. The calling information generation module 1053 is configured to generate calling information of the second graphics API. The calling information of the second graphics API is used to instruct the client 20 to call a second graphics API in the second graphics library 203, and the calling information of the second graphics API includes a parameter related to the second graphics API and an identifier of the second graphics API. The calling information sending module 1054 is configured to send the calling information of the second graphics API to the client 20.

Optionally, the calling information sending module 1054 is specifically configured to: store the calling information of the first graphics API and the calling information of the second graphics API in a first in first out queue; and after a predetermined condition is met, send the data in the first in first out queue to the client 20.

After the first graphics API corresponding to the first drawing instruction initiated by the application program on the server has been called, the application program may immediately locally obtain the first processing notification used to notify the application program that the first graphics API has been called. Therefore, the application program on the server can run independently without relying on the client, so that even if the client breaks down or the client is disconnected from the server, running of the application program on the server is not affected, and user experience can be improved.

Further, the server generates the calling information of the first graphics API carrying the parameter related to the first graphics API, and sends the calling information of the first graphics API to the client. The client may call the first graphics API in the second graphics library based on the parameter related to the first graphics API. Because the application program on the server has received the first processing notification, after calling the first graphics API in the second graphics library, the client does not need to send a processing notification to the application program on the server. Therefore, unidirectional transmission is implemented between the server and the client, and a requirement for a network latency can be reduced.

Figure 11:
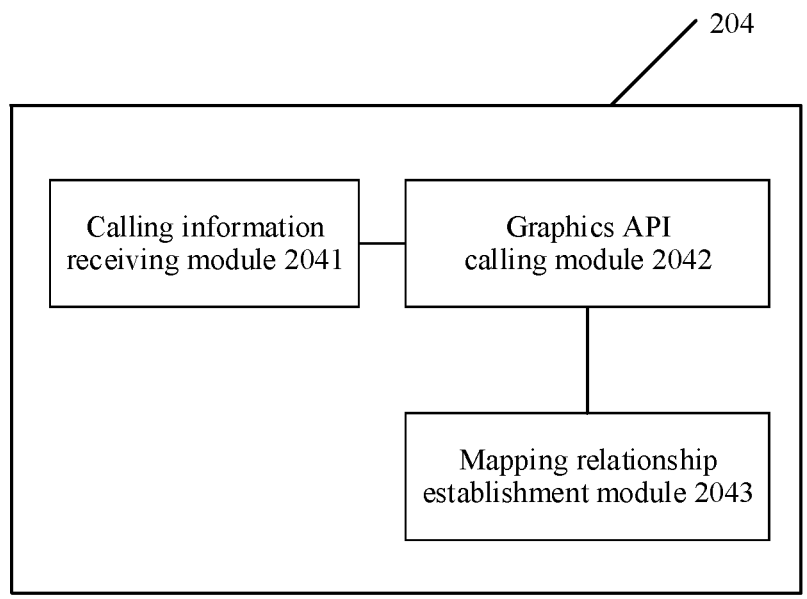
FIG. 11 is another schematic structural diagram of an apparatus of a graphics processing apparatus according to this embodiment of the present invention.

Referring to FIG. 11, an embodiment of the present invention further provides a graphics processing apparatus. FIG. 11 is another schematic structural diagram of an apparatus of the graphics processing apparatus according to this embodiment of the present invention. The graphics processing apparatus is included in the client 20. As shown in FIG. 11, the graphics processing apparatus 204 includes:

a calling information receiving module 2041, configured to receive calling information that is of a first graphics API and that is sent by the server 10, where the calling information of the first graphics API includes a parameter related to the first graphics API and an identifier of the first graphics API; and a graphics API calling module 2042, configured to determine the first graphics API based on the identifier of the first graphics API in the calling information of the first graphics API, and call a first graphics API in the second graphics library 203 based on the parameter related to the first graphics API in the calling information of the first graphics API.

Optionally, the graphics processing apparatus 204 further includes a mapping relationship establishment module 2043, configured to: when the parameter related to the first graphics API in the calling information of the first graphics API includes an output parameter generated when the first graphics API is called by the server 10, obtain an output parameter generated when the first graphics API is called by the client 20; and establish a mapping relationship between the output parameter generated when the first graphics API is called by the server 10 and the output parameter generated when the first graphics API is called by the client 20

Optionally, the calling information receiving module 2041 is further configured to receive calling information that is of the second graphics API and that is sent by the server 10. The calling information of the second graphics API includes a parameter related to the second graphics API and an identifier of the second graphics API, an input parameter of the second graphics API is the output parameter generated when the first graphics API is called by the server 10. The graphics API calling module 2042 is further configured to determine the second graphics API based on the identifier of the second graphics API. The graphics API calling module 2042 is further configured to query the mapping relationship based on the input parameter of the second graphics API, to obtain a parameter corresponding to the input parameter of the second graphics API in the mapping relationship. The parameter corresponding to the input parameter of the second graphics API in the mapping relationship is the output parameter generated when the first graphics API is called by the client 20.

Optionally, the calling information receiving module 2041 is specifically configured to receive the data sent by the server 10, where the data includes the calling information of the first graphics API and the calling information of the second graphics API.

The client receives the calling information of the first graphics API from the server, and may call the first graphics API in the second graphics library based on the parameter related to the first graphics API. Because the first graphics API in the first graphics library on the server has been called, after calling the first graphics API in the second graphics library, the client does not need to send a processing notification to the application program on the server. Therefore, unidirectional transmission is implemented between the server and the client, and a requirement for a network latency can be reduced.

Figure 12:
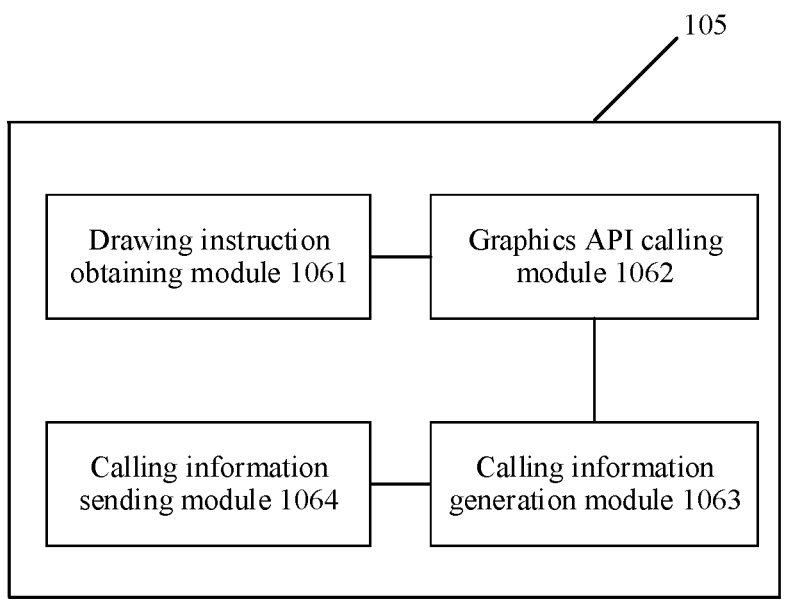
FIG. 12 is another schematic structural diagram of an apparatus of a graphics processing apparatus according to this embodiment of the present invention.

Referring to FIG. 12, an embodiment of the present invention further provides a graphics processing apparatus. FIG. 12 is another schematic structural diagram of an apparatus of the graphics processing apparatus according to this embodiment of the present invention. The graphics processing apparatus is included in the server 10. As shown in FIG. 12, the graphics processing apparatus 105 includes:

a drawing instruction obtaining module 1061, configured to obtain a first drawing instruction initiated by the application program 104, where the first drawing instruction corresponds to a first graphics API;

a graphics API calling module 1062, configured to: when determining that the first graphics API is a predetermined graphics API in the first graphics library, refuse to call a first graphics API in the first graphics library; where the graphics API calling module 1062 is further configured to send a first processing notification to the application program 104, where the first processing notification is used to notify the application program 104 that the first graphics API has been called;

a calling information generation module 1063, configured to generate calling information of the first graphics API, where the calling information of the first graphics API is used to instruct the client to call the first graphics API in the second graphics library, and the calling information of the first graphics API includes a parameter related to the first graphics API and an identifier of the first graphics API; and a calling information sending module 1064, configured to send the calling information of the first graphics API to the client.

Optionally, the calling information of the first graphics API includes an input parameter of the first graphics API and the identifier of the first graphics API.

Optionally, the predetermined graphics API includes any one of a shader-starting graphics API, a rasterization-starting graphics API, or a buffer-swapping graphics API.

When the first graphics API is the predetermined graphics API, the graphics processing apparatus 105 refuses to call the first graphics API corresponding to the first drawing instruction initiated by the application program on the server, and sends the first processing notification to the application program, to notify the application program that the first graphics API has been called. Therefore, the application program on the server may run independently without relying on the client, so that even if the client breaks down or the client is disconnected from the server, running of the application program on the server is not affected, and user experience can be improved.

In addition, because the server does not need to display a drawn graphic to a user, even if the first graphics API corresponding to the first drawing instruction initiated by the application program on the server is refused to be called and the GPU on the server does not work, user experience is not affected.

Figure 13:
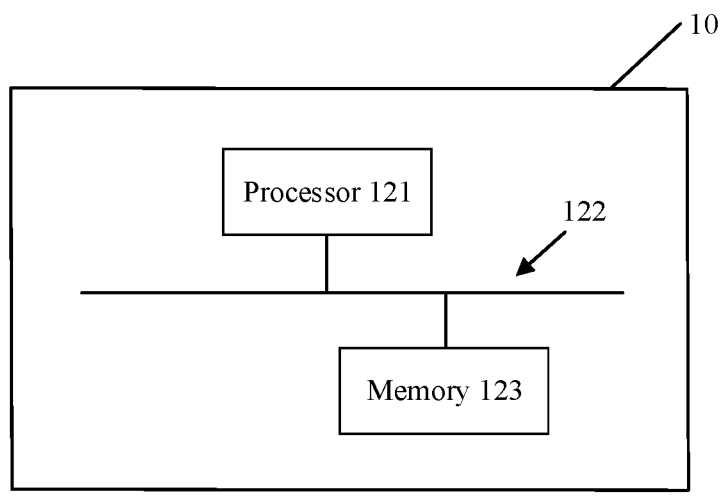
FIG. 13 is a schematic structural diagram of an apparatus of a server according to an embodiment of the present invention.

FIG. 13 is a schematic structural diagram of an apparatus of a server according to an embodiment of the present invention. As shown in FIG. 13, the server 10 includes a processor 121, a bus 122, and a memory 123. The processor 121 and the memory 123 are connected to the bus 122, the memory 123 stores a program instruction, and the processor 121 executes the program instruction to complete a function of the first graphics processing apparatus 105 described above.

Figure 14:
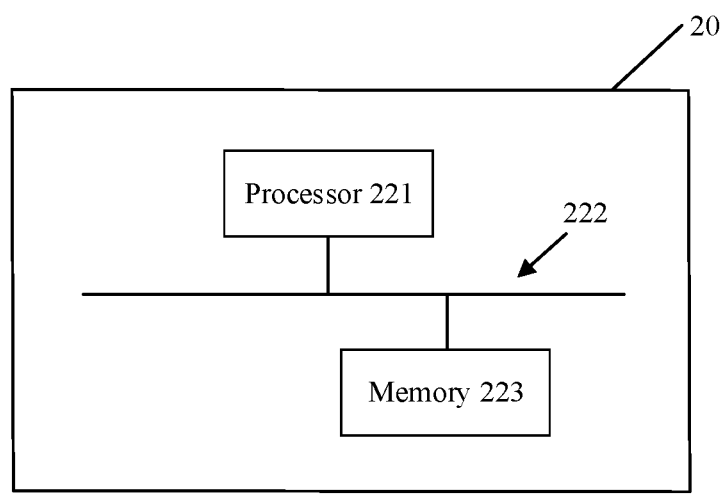
FIG. 14 is a schematic structural diagram of an apparatus of a client according to an embodiment of the present invention.

FIG. 14 is a schematic structural diagram of an apparatus of a client according to an embodiment of the present invention. As shown in FIG. 14, the client 20 includes a processor 221, a bus 222, and a memory 223. The processor 221 and the memory 223 are connected to the bus 222, the memory 223 stores a program instruction, and the processor 221 executes the program instruction to complete a function of the second graphics processing apparatus 204 described above.

It should be noted that, any apparatus embodiment described above is merely an example. The units described as separate parts may or may not be physically separate, and parts displayed as units may or may not be physical units, may be located in one position, or may be distributed on a plurality of network units. Some or all the modules may be selected depending on actual needs to achieve the objectives of the solutions of the embodiments. In addition, in the accompanying drawings of the apparatus embodiments provided in the present invention, connection relationships between modules indicate that the modules have communication connections to each other, which may be specifically implemented as one or more communications buses or signal cables. A person of ordinary skill in the art may understand and implement the embodiments of the present invention without creative efforts.

Based on the descriptions of the foregoing implementations, a person skilled in the art may clearly understand that the present invention may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation in most cases. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions used to instruct a computer device (which may be a personal computer, a server, a network device, or the like) to perform the methods described in the embodiments of the present invention.

It may be clearly understood by a person skilled in the art that, for a detailed working process of the foregoing system, apparatus, or unit, reference may be made to a corresponding process in the foregoing method embodiments, and details are not described herein again.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A graphics processing method, wherein the method is applied to a server, the server is provided with a first graphics library and an application program, a client is provided with a second graphics library, the first graphics library comprises a plurality of graphics application programming interfaces (APIs), the second graphics library comprises a plurality of graphics APIs, at least M graphics APIs in the first graphics library one-to-one correspond to M graphics APIs in the second graphics library, and the method comprises:
  obtaining a first drawing instruction initiated by the application program, wherein the first drawing instruction corresponds to a first graphics API in the first graphics library;
  calling the first graphics API in the first graphics library according to the first drawing instruction to execute the first drawing instruction, and sending a first processing notification to the application program, wherein the first processing notification is used to notify the application program that the first graphics API in the first graphics library has been called;
  generating calling information of the first graphics API in the first graphics library, wherein the calling information of the first graphics API in the first graphics library is used to instruct the client to call a first graphics API in the second graphics library, and the calling information of the first graphics API in the first graphics library comprises a parameter related to the first graphics API in the first graphics library and an identifier of the first graphics API in the first graphics library; and
  sending the calling information of the first graphics API in the first graphics library to the client.

2. The method according to claim 1, wherein the method further comprises:
  determining an output parameter needs to be returned for the first graphics API in the first graphics library, wherein
  when the output parameter needs to be returned for the first graphics API in the first graphics library, the first processing notification further comprises an output parameter generated when the first graphics API in the first graphics library is called by the server, and the calling information of the first graphics API in the first graphics library comprises an input parameter of the first graphics API in the first graphics library, the output parameter generated when the first graphics API in the first graphics library is called by the server, and the identifier of the first graphics API in the first graphics library.

3. The method according to claim 2, wherein when no output parameter needs to be returned by the first graphics API in the first graphics library, the calling information of the first graphics API comprises the input parameter of the first graphics API in the first graphics library and the identifier of the first graphics API in the first graphics library.

4. The method according to claim 2, wherein the method further comprises:
  receiving a second drawing instruction initiated by the application program based on the first processing notification, wherein the second drawing instruction corresponds to a second graphics API in the first graphics library, and an input parameter of the second graphics API in the first graphics library is the output parameter generated when the first graphics API in the first graphics library is called by the server;
  calling the second graphics API in the first graphics library according to the second drawing instruction, and sending a second processing notification to the application program, wherein the second processing notification is used to notify the application program that the second graphics API in the first graphics library has been called;
  generating calling information of the second graphics API in the first graphics library, wherein the calling information of the second graphics API in the first graphics library is used to instruct the client to call a second graphics API in the second graphics library, and the calling information of the second graphics API in the first graphics library comprises a parameter related to the second graphics API in the first graphics library and an identifier of the second graphics API in the first graphics library; and
  sending the calling information of the second graphics API in the first graphics library to the client.

5. The method according to claim 4, wherein the method further comprises:
  storing the calling information of the first graphics API in the first graphics library and the calling information of the second graphics API in the first graphics library in a first out queue; and
  after a predetermined condition is met, simultaneously sending the calling information of the first graphics API in the first graphics library and the calling information of the second graphics API in the first graphics library in the first out queue to the client.

6. A graphics processing method, wherein the method is applied to a client, a server is provided with a first graphics library, the client is provided with a second graphics library, the first graphics library comprises a plurality of graphics application programming interfaces (APIs), the second graphics library comprises a plurality of graphics APIs, at least M graphics APIs in the first graphics library one-to-one correspond to M graphics APIs in the second graphics library, and the method comprises:
receiving calling information that is of a first graphics API in the first graphics library and that is sent by the server, wherein the calling information of the first graphics API in the first graphics library comprises a parameter related to the first graphics API in the first graphics library and an identifier of the first graphics API in the first graphics library; and
calling a first graphics API in the second graphics library based on the identifier of the first graphics API in the first graphics library in the calling information of the first graphics API in the first graphics library and the parameter related to the first graphics API in the first graphics library in the calling information of the first graphics API.

7. The method according to claim 6, wherein the method further comprises:
determining the parameter related to the first graphics API in the first graphics library in the calling information of the first graphics API in the first graphics library comprises an output parameter generated when the first graphics API in the first graphics library is called by the server;
obtaining an output parameter generated when the first graphics API in the second graphics library is called by the client;
establishing a mapping relationship between the output parameter generated when the first graphics API in the first graphics library is called by the server and the output parameter generated when the first graphics API in the second graphics library is called by the client.

8. The method according to claim 7, wherein the method further comprises:
receiving calling information that is of a second graphics API in the first graphics library and that is sent by the server, wherein the calling information of the second graphics API in the first graphics library comprises a parameter related to the second graphics API in the first graphics library and an identifier of the second graphics API in the first graphics library, and an input parameter of the second graphics API in the first graphics library is the output parameter generated when the first graphics API in the first graphics library is called by the server;
determining the second graphics API in the second graphics library based on the identifier of the second graphics API in the first graphics library; and
querying the mapping relationship based on the input parameter of the second graphics API in the first graphics library, to obtain a parameter corresponding to the input parameter of the second graphics API in the first graphics library in the mapping relationship, wherein the parameter corresponding to the input parameter of the second graphics API in the first graphics library in the mapping relationship is the output parameter generated when the first graphics API in the second graphics library is called by the client.

9. The method according to claim 8, wherein the method further comprises:
receiving the calling information of the first graphics API in the first graphics library and the calling information of the second graphics API in the first graphics library that are simultaneously sent by the server.

10. A server, comprising a processor and a memory, wherein the memory stores a program instruction, and the processor runs the program instruction to perform the method:
obtaining a first drawing instruction initiated by a application program, wherein the first drawing instruction corresponds to a first graphics API in a first graphics library;
calling the first graphics API in the first graphics library according to the first drawing instruction to execute the first drawing instruction, and sending a first processing notification to the application program, wherein the first processing notification is used to notify the application program that the first graphics API in the first graphics library has been called;
generating calling information of the first graphics API in the first graphics library, wherein the calling information of the first graphics API in the first graphics library is used to instruct the client to call a first graphics API in a second graphics library, and the calling information of the first graphics API in the first graphics library comprises a parameter related to the first graphics API in the first graphics library and an identifier of the first graphics API in the first graphics library; and
sending the calling information of the first graphics API in the first graphics library to a client.

11. The server according to claim 10, wherein the processor further runs the program instruction to perform the method:
determining an output parameter needs to be returned for the first graphics API in the first graphics library, wherein
when the output parameter needs to be returned for the first graphics API in the first graphics library, the first processing notification further comprises an output parameter generated when the first graphics API in the first graphics library is called by the server, and the calling information of the first graphics API in the first graphics library comprises an input parameter of the first graphics API in the first graphics library, the output parameter generated when the first graphics API in the first graphics library is called by the server, and the identifier of the first graphics API in the first graphics library.

12. The server according to claim 11, wherein when no output parameter needs to be returned by the first graphics API in the first graphics library, the calling information of the first graphics API comprises the input parameter of the first graphics API in the first graphics library and the identifier of the first graphics API in the first graphics library.

13. The server according to claim 11, wherein the processor further runs the program instruction to perform the method:
receiving a second drawing instruction initiated by the application program based on the first processing notification, wherein the second drawing instruction corresponds to a second graphics API in the first graphics library, and an input parameter of the second graphics API in the first graphics library is the output parameter generated when the first graphics API in the first graphics library is called by the server;
calling the second graphics API in the first graphics library according to the second drawing instruction, and sending a second processing notification to the application program, wherein the second processing notification is used to notify the application program that the second graphics API in the first graphics library has been called;
generating calling information of the second graphics API in the first graphics library, wherein the calling information of the second graphics API in the first graphics library is used to instruct the client to call a second graphics API in the second graphics library, and the calling information of the second graphics API in the first graphics library comprises a parameter related to the second graphics API in the first graphics library and an identifier of the second graphics API in the first graphics library; and
sending the calling information of the second graphics API in the first graphics library to the client.

14. The server according to claim 13, wherein the processor further runs the program instruction to perform the method:
storing the calling information of the first graphics API in the first graphics library and the calling information of the second graphics API in the first graphics library in a first out queue; and
after a predetermined condition is met, simultaneously sending the calling information of the first graphics API in the first graphics library and the calling information of the second graphics API in the first graphics library in the first out queue to the client.

15. A client, comprising a processor and a memory, wherein the memory stores a program instruction, and the processor runs the program instruction to perform the method:
receiving calling information that is of a first graphics API in a first graphics library and that is sent by a server, wherein the calling information of the first graphics API in the first graphics library comprises a parameter related to the first graphics API in the first graphics library and an identifier of the first graphics API in the first graphics library; and
calling a first graphics API in the second graphics library based on the identifier of the first graphics API in the first graphics library in the calling information of the first graphics API in the first graphics library and the parameter related to the first graphics API in the first graphics library in the calling information of the first graphics API.

16. The client according to claim 15, wherein the processor further runs the program instruction to perform the method:
determining the parameter related to the first graphics API in the first graphics library in the calling information of the first graphics API in the first graphics library comprises an output parameter generated when the first graphics API in the first graphics library is called by the server;
obtaining an output parameter generated when the first graphics API in the second graphics library is called by the client;
establishing a mapping relationship between the output parameter generated when the first graphics API in the first graphics library is called by the server and the output parameter generated when the first graphics API in the second graphics library is called by the client.

17. The client according to claim 16, wherein the processor further runs the program instruction to perform the method:
receiving calling information that is of a second graphics API in the first graphics library and that is sent by the server, wherein the calling information of the second graphics API in the first graphics library comprises a parameter related to the second graphics API in the first graphics library and an identifier of the second graphics API in the first graphics library, and an input parameter of the second graphics API in the first graphics library is the output parameter generated when the first graphics API in the first graphics library is called by the server;
determining the second graphics API in the second graphics library based on the identifier of the second graphics API in the first graphics library; and
querying the mapping relationship based on the input parameter of the second graphics API in the first graphics library, to obtain a parameter corresponding to the input parameter of the second graphics API in the first graphics library in the mapping relationship, wherein the parameter corresponding to the input parameter of the second graphics API in the first graphics library in the mapping relationship is the output parameter generated when the first graphics API in the second graphics library is called by the client.

18. The client according to claim 17, wherein the processor further runs the program instruction to perform the method:
receiving the calling information of the first graphics API in the first graphics library and the calling information of the second graphics API in the first graphics library that are simultaneously sent by the server.

* * * * *